United States Patent
Maresca, Jr. et al.

(10) Patent No.: US 11,796,450 B1
(45) Date of Patent: Oct. 24, 2023

(54) METHOD AND APPARATUS FOR DETERMINING THE TIME BETWEEN INTERNAL INSPECTIONS OF A TANK

(71) Applicant: Vista Precision Solutions, Inc., Richland, WA (US)

(72) Inventors: Joseph W. Maresca, Jr., Sunnyvale, CA (US); Stephen D. Ford, Tipp City, OH (US); Douglas W. Mann, Tipp City, OH (US)

(73) Assignee: Vista Precision Solutions, Inc., Richland, WA (US)

( * ) Notice: Subject to any disclaimer, the term of this patent is extended or adjusted under 35 U.S.C. 154(b) by 1,020 days.

(21) Appl. No.: 15/905,227

(22) Filed: Feb. 26, 2018

Related U.S. Application Data

(63) Continuation of application No. 14/061,484, filed on Oct. 23, 2013, now abandoned, which is a continuation-in-part of application No. 13/786,316, filed on Mar. 5, 2013, now Pat. No. 9,228,932.

(60) Provisional application No. 61/814,786, filed on Apr. 22, 2013, provisional application No. 61/795,737, filed on Oct. 23, 2012, provisional application No. 61/634,786, filed on Mar. 5, 2012.

(51) Int. Cl.
*G01N 17/00* (2006.01)
*G01M 3/04* (2006.01)
*G01N 29/14* (2006.01)

(52) U.S. Cl.
CPC .............. *G01N 17/00* (2013.01); *G01M 3/04* (2013.01); *G01N 29/14* (2013.01)

(58) Field of Classification Search
CPC ........... G01N 17/00; G01M 3/04; G01N 29/14

USPC ........................................................ 702/34
See application file for complete search history.

(56) References Cited

U.S. PATENT DOCUMENTS

| | | | |
|---|---|---|---|
| 4,418,574 A | | 12/1983 | Flournoy |
| 4,918,989 A | | 4/1990 | Desruelles et al. |
| 5,231,866 A | | 8/1993 | Peacock |
| 5,375,455 A | * | 12/1994 | Maresca, Jr. et al. G01M 3/2892 73/40.5R |

(Continued)

OTHER PUBLICATIONS

United States Patent and Trademark Office, Notice of Allowance issued in U.S. Appl. No. 15/917,277, May 13, 2020.

(Continued)

*Primary Examiner* — Kyle R Quigley
(74) *Attorney, Agent, or Firm* — PILLSBURY WINTHROP SHAW PITTMAN LLP

(57) ABSTRACT

The method and apparatus of the present invention will provide a means for a tank owner to determine the time until the next out-of-service API 653 internal inspection of an aboveground storage tank (AST) or an underground storage tank (UST) should be considered or performed based on in-service measurements of the tank filled with fuel or another liquid. The inspection interval is determined from a leak detection test with a pass and a probability distribution of the survival rate of the tank bottom that is representative of the tank being inspected. More accurate estimates are obtained by using measurements of the thickness and corrosion rate of the tank bottom at one or a few locations in the tank and the results of an acoustic emission (AE) corrosion activity test and/or previous out-of-service inspection measurements of the tank floor bottom thickness of the floor at many locations. The method is based on the concept of equivalent risk.

29 Claims, 6 Drawing Sheets

(56) References Cited

U.S. PATENT DOCUMENTS

| | | | |
|---|---|---|---|
| 5,499,540 A | 3/1996 | Whaley et al. | |
| 5,634,378 A | 6/1997 | Burkhardt, Jr. et al. | |
| 5,854,557 A | 12/1998 | Tiefnig | |
| 6,047,241 A * | 4/2000 | Sparago | G21D 3/001 702/34 |
| 6,253,615 B1 | 7/2001 | Simmonds et al. | |
| 6,556,924 B1* | 4/2003 | Kariyawasam et al. | G06Q 10/04 285/15 |
| 7,143,635 B1 | 12/2006 | Major et al. | |
| 7,508,223 B1 | 3/2009 | Yang et al. | |
| 9,228,932 B1 | 1/2016 | Maresca, Jr. et al. | |
| 9,766,175 B1 | 9/2017 | Maresca, Jr. et al. | |
| 10,281,387 B2 | 5/2019 | Maresca, Jr. et al. | |
| 10,495,564 B2 | 12/2019 | Maresca, Jr. et al. | |
| 2002/0043973 A1 | 4/2002 | Amini et al. | |
| 2005/0011278 A1 | 1/2005 | Brown et al. | |
| 2005/0246112 A1* | 11/2005 | Abhulimen et al. | G01M 3/2807 702/51 |
| 2006/0010995 A1 | 1/2006 | Silverman et al. | |
| 2006/0101920 A1 | 5/2006 | Carnal et al. | |
| 2006/0169022 A1 | 8/2006 | Sato et al. | |
| 2006/0283251 A1 | 12/2006 | Hunaidi et al. | |
| 2007/0186623 A1 | 8/2007 | Wolford et al. | |
| 2009/0134867 A1 | 5/2009 | Hatanaka et al. | |
| 2009/0158850 A1 | 6/2009 | Alleyne et al. | |
| 2009/0301203 A1 | 12/2009 | Brussieux | |
| 2010/0212404 A1 | 8/2010 | Wolford et al. | |
| 2011/0185814 A1 | 8/2011 | Piccolo | |
| 2012/0317058 A1* | 12/2012 | Abhulimen | G06N 3/0427 706/2 |
| 2015/0204821 A1 | 7/2015 | Adams et al. | |
| 2016/0123864 A1 | 5/2016 | Maresca, Jr. et al. | |
| 2017/0372196 A1 | 12/2017 | Traidia et al. | |
| 2019/0316902 A1 | 10/2019 | Sparago | |

OTHER PUBLICATIONS

United States Patent and Trademark Office, Notice of Allowance PTO-892 issued in U.S. Appl. No. 17/019,819, Sep. 1, 2021, pg. 1.
United States Patent and Trademark Office, Office Action issued in U.S. Appl. No. 15/678,023, May 21, 2020.

* cited by examiner

METHOD AND APPARATUS FOR DETERMINING THE TIME BETWEEN INTERNAL INSPECTIONS OF A TANK

RELATED APPLICATIONS

This application is a continuation of U.S. Pat. Application Serial No. 14/061,484 filed Oct. 23, 2013, which claims priority from U.S. Provisional Pat. Application Serial No. 61/795,737 filed Oct. 23, 2012, and U.S. Provisional Pat. Application Serial No. 61/814,786 filed Apr. 22, 2013, and is a continuation-in-part of U.S. Pat. Application Serial No. 13/786,316 filed Mar. 5, 2013 (now U.S. Pat. No. 9,228,932), which claims priority from 61/634,786, filed Mar. 5, 2012, and are incorporated by reference herein.

FIELD OF THE INVENTION

The method and apparatuses of the present invention can be used to compute or update the time until the next out-of-service internal inspection of an aboveground storage tank (AST) or a bulk underground storage tank (UST) based on a risk-based inspection approach using a Bayesian analysis approach and a leak detection test with a passing result. Longer time internals with increased accuracy and reliability can be achieved with one or more of the following: in-service measurements of tank floor thickness and corrosion rate at one or a few locations, the results an in-service acoustic emission (AE) corrosion activity test where the results indicate little or no corrosion, and one or more previous out-of-service inspections where the thickness and corrosion rate is determined from many tank floor thickness measurements over the entire floor. The method can be used to estimate the time interval to the next inspection as described in API Recommended Practice 653 or similar standards such as API12R1, STI SP001, and other out-of-service internal inspections recommended practices and methods.

BRIEF DESCRIPTION OF THE PRIOR ART

There are several recommended practices or standards for inspecting the integrity of welded or riveted, atmospheric pressure; aboveground storage tanks (ASTs) after they have been placed in service. API 653 covers the maintenance inspection, repair, alteration, relocation, and reconstruction of such tanks. It is a performance-based inspection with the time between inspections being 10 years or more for out-of-service internal inspections and 5 years or less for in-service external inspections. The scope of this API publication is limited to the tank foundation, bottom, shell, structure, roof, attached appurtenances, and nozzles to the face of the first flange, first threaded joint, or first welding-end connection. While it can be used for inspecting shop-fabricated tanks, it is mainly intended for field-erected ASTs. It is also used for many of the military's large, bulk underground storage tanks. In September 2000, the Steel Tank Institute (STI SP001) published a standard for inspection and repair of shop-fabricated steel tanks. The STI standard addresses double wall tanks and tanks with integral secondary containment pans as well as horizontal tanks; none of these tanks are within the scope of API 653. This standard includes a risk-based approach to inspections. The risk-based approach is a function of the size, containment, release prevention and detection, and corrosion history of the tank.

In 1988, the U.S. Environmental Protection Agency (EPA) Code of Federal Regulations (CFR) 40 CFR Part 280 and 40 CFR Part 112 mandated industry standard inspections on tanks and piping that have the potential of impacting the environment as the result of a product release due to a leak or a tank or pipe failure. Each state has implemented this regulation with the EPA standards establishing the minimum requirements. Large, bulk underground and all aboveground storage tanks were excluded from the integrity parts of the regulation. Until recently, only a few states regulated the inspection of these large tanks for integrity. The Spills Prevention Controls and Countermeasures Program (SPCC) generally controls the inspection of petroleum facilities containing ASTs or bulk USTs. Recently, the guidelines for periodic inspection of these large tanks has become mandatory. The petroleum industry has been performing inspections on their tanks for many years, because it is the criterion by which a facility is judged when tank release or tank failure incidents occur.

API Recommended Practice 580 describes the elements of a risk-based approach to an inspection program. It provides the guidance for developing, implementing, and maintaining a risk-based inspection (RBI) program. The guidelines include the means for assessing the program and its plan, while emphasizing safe and reliable operations. The ultimate goal of an internal inspection is the safety and reliability of the operating facilities. A risk-based approach, which takes into account the probability of a failure and the consequence of a failure, can be used to set better intervals between inspections. This approach acknowledges that it is important to focus the highest efforts and resources on address maintenance and repairs on those facilities needing it most. By focusing these efforts where they are needed most, more problems will be found earlier and the facilities will be operated safer and less expensively. A risk-based approach also saves money and a permits better use of the operational facilities, because they do not need to be taken out of service before it is necessary. The internal inspection time interval, which has been the practice, can be very costly and may not result in less than optimal maintenance and repair. A risk-based approach will better prioritize and manage the tank inspection program. The method and apparatuses of the present invention describe such an approach for determining the time interval between inspections, including an estimate of how long a scheduled inspection can be postponed. The method and apparatuses of the present invention are very measurement oriented.

The latest edition (i.e., the 4$^{th}$ editions and later ones) of API 653 includes the relevant sections of API 580 and 581 for petroleum storage tanks and other types of tanks containing liquids at atmospheric pressure.

As stated above, there are basic two types of inspections: an in-service and an out-of-service. The in-service inspection requires an inspection of the external parts of the tank, including the tank shell and the chime, while an out-of-service inspection requires both internal and external inspection, including the tank floor. In general, API 653 and most regulatory agencies require an out-of-service inspection every 10 years unless the tank is in good shape, the corrosion rate is low, and the minimum required thickness of the tank floor will not be exceeded in 10 years. An out-of-service inspection is very expensive, not only because of the inspection itself, but the loss of the tank for operations during the inspection, repairs, and maintenance activities. An in-tank inspection, which is normally performed every five years, is less expensive, because the inspection can be performed on those parts of the tank that are visually and easily accessible.

API and others have developed a formula for quantifying the Minimum Remaining Thickness (MRT) of the bottom of the tank after a floor inspection and any necessary repairs have been made:

$$MRT = \{\text{Minimum of } RT_{bc} \text{ or } RT_{ip}\} - O_r(StP_r + UP_r)$$

where

MRT: Minimum remaining thickness at the next inspection $O_r$: Interval to the next inspection in years $UP_r$: Underside corrosion rate before repairs $StP_r$: Internal corrosion rate before repairs $RT_{bc}$: Minimum remaining thickness from underside corrosion after repairs $RT_{ip}$: Minimum remaining thickness from internal corrosion after repairs Thus, if we assume that we want the floor to have a minimum thickness of at least 0.10 in. (MRT = 0.10 in.), we can compute the interval between inspections, or if we measure or know $UP_r$, $StP_r$, $RT_{bc}$, and $RT_{ip}$. If $UP_r = 0.135$ in./year and $StP_r = 0.0034$ in./year based on the corrosion rate determined from the previous inspection, and if $RT_{bc} = 0.135$ in. and $RT_{ip} = 0.170$ in. after repairs have been made, then $O_r = 6.03 = 6$ years. These thickness and corrosion data can be obtained from UT floor thickness measurements and magnetic flux floor measurements. The present method and apparatuses make a very good estimate of this thickness.

Once the out-of-service inspection is complete and the tank it returned to service, the tank must have sufficient floor thickness to avoid structural failure until the next inspection. The minimum thickness of the floor between the time of the out-of-service inspection (or the time a new tank is put in service) and the next inspection needs to be greater than 0.10 in. for tank bottoms and foundations with no means for detection and containment of a bottom leak. The minimum thickness is less (0.05 in.) for tanks with bottom and foundation designs with a means to provide detection and containment of a bottom leak, if one were to occur.

The method and apparatuses are aimed at supporting and help better managing planned annual facility inspection, repair, maintenance, and repair programs. In general, each tank facility plans to perform an inspection on one or more tanks each year so that all tanks undergo an inspection each 10 years. Longer inspection intervals are possible (e.g., 20 years) based on the corrosion rate determined in an API 653 inspection. In many facilities and for most regulatory requirements, the time interval until a tank is required according to recommended practice taken out-of-service to undergo an out-of-tank inspection is done on a time basis. Risk-based inspection assessments are used to better focus, prioritize, and manage the efforts on tank inspection programs so that the focus is on those areas of tank integrity with the highest risk. A risk-based approach to tank inspection permits better and more informed decisions about the need, priority, and schedule for inspections.

The method and apparatuses of the present invention is motivated by the need to more accurately estimate the time between out-of-service tank inspection, maintenance, and repair activities in aboveground storage tanks and large, bulk underground bulk tanks without taking the tank out-of-service and is based on the risk-based inspection approach being allowed by API 653. The method and apparatus apply to a wide variety of tanks (e.g., production, refined petroleum, and chemical tanks) containing a wide variety of different types of products/liquids, particularly petroleum fuels, both refined and crude fuels.

This method has the capability for significant saving by the tank owner, because the interval between internal inspections can be accurately estimated and updated and for minimizing the air pollution that occurs every time an out-of-service inspection is performed because the fuel in the tank needs to be removed. The proposed method and apparatuses give the tank owner and operator a method for determining the priority and best schedule for performing tank maintenance.

In U.S. Pat. 9,228,932 Maresca, et. al., teaches a risk-based method for computing or updating the internal inspection interval using a Bayesian approach. In U.S. Pat. 9,766,175, Maresca, et. al., describes methods and apparatuses for in-service measurement of the bottom thickness and corrosion rate of a tank bottom.

Regular in-service inspections are performed on most tanks. These inspections are typically conducted every 5 years and address the condition of the accessible portions of the tank. Visual inspection is a very important part of this process. UT measurements of the thickness of the shell are routinely made to insure the tank has sufficient wall thickness (i.e., strength) to support the product. Unfortunately, most problems occur in the tank floor where visual access is not possible without tanking the tank out of service, removing the product from the tank, and cleaning the tank. As a consequence, the interval between tank inspections is typically set based on a schedule and/or the rate of corrosion estimated from a previous tank inspection. More recently, risk assessment procedures have also been developed to determine this interval. Typically, the time interval between inspections is 10 years although longer intervals may be possible for tanks in good shape. The basic internal inspection procedure (API 653, API12R, or STI SP001) is designed to insure that the structure is in good shape (i.e., not corroding) with the walls, floor, and appurtenances having adequate thickness to structurally support tank operations until the next inspection. As stated above, API 580 has established the guidelines for implementing a tank inspection with the goal of establishing meaningful and cost-effective intervals for inspections. However, they have not specified methods or acceptable approaches. They acknowledge that tanks that have the potential for being in poor shape should be inspected more frequently than tanks in good shape. The difficulty has been to meaningfully assess the condition of the tank and to meaningfully set a safe inspection interval.

There have been a number of approaches for assessing the condition of the tank, for better prioritizing which tanks should be inspected first, and for safely and reliably extending the time between inspections.

The main methods used to justify extending the time between inspections have been AE methods. For example, a number of methods use the AE inspection method called TANKPAC™ that were developed by Physical Acoustics. Generally, 12 AE sensors are mounted on the external wall of an AST, and the data is collected and analyzed after a 24-h waiting period for the tank to become acoustically quiet. This method is expensive to use and requires a high degree of technician skill to obtain accurate results. Furthermore, AE methods do not measure floor thickness and are not reliable as leak detection methods. In addition, these methods are not always reliable when indicating the presence of corrosion. The method used by the present invention, however, is very reliable in indicating the absence of corrosion activity. This has been verified by extensive field evaluations where full out-of-service internal inspections have followed previous AE measurements. If the results of an AE corrosion activity test showing little or no corrosion activity is combined with a passing leak detection test and/or a local measurement of floor thickness, a strong basis for estimating or updating the interval until the next out-of-service inspections can be made while the tank is in-service and contains fuel.

Other methods besides AE corrosion activity tests have been used to assess the rate of corrosion such as Long Range Ultrasonic Techniques (LRUTs), where acoustic sensors are placed on the outside wall floor of the tank. The main issue is that AE methods do not measure floor thickness and as a consequence, corrosion rates and floor thickness cannot be accurately evaluated (e.g., using Eq. (1)). LRUT can be used to estimate tank floor thickness but only in the region near the perimeter of the tank.

Loo reported on a study of 148 aboveground storage tanks inspected using an AE method (TANKPAC™ produced by Physical Acoustics) of assessing the corrosion activity in the floor of an aboveground storage tank while in-service. The AE results for each of these 148 tanks were compared to the results of an internal tank floor inspection performed as part of an out-of-service inspection. Of the 148 tanks, 33 were crude tanks and 115 were refined product tanks. The results were summarized in Figure 2 of Loo's paper. The results of the internal inspections (i.e., the actual or true condition of the tank) were reported in terms of four categories (FU1, FU2, FU3, and FU4). The results of the AE tests, which were reported in terms of five corrosion grades from A to E (as defined below), were compared to the out-of-service inspection results. The definitions of the AE Test Results and the out-of-service internal inspections are given below:

| AE Test Results | Maintenance and Repair |
|---|---|
| A: Very minor | No maintenance necessary |
| B: Minor | No maintenance necessary |
| C: Intermediate | Some maintenance is needed |
| D: Active | Give priority in maintenance schedule |
| E: Highly active | Give highest priority in maintenance schedule |

| Out-of-Service Internal Inspection Results | |
|---|---|
| FU1: No damage/No repair | (A) |
| FU2: Minor damage/No repair | (B, some C) |
| FU3: Damage/Some repair | (D, some C) |
| FU4: Damage/Major repair/New floor | (E) |

As will be described below, there is some uncertainty on how to compare the results of the 5 AE Test Results with the four internal inspections, mainly with respect to Grade C and FU2 and FU3.

Table 1 herein summarizes the results obtained from Figure 2 of Loo. The table illustrates some very important conclusions about (1) the overall condition of the tanks in the population and (2) the overall reliability of the AE method. Depending on the actual results of the AE test, it can be very reliable in supporting the tank assessment either as applied by Loo or as applied in the present invention. However, in general, our assessment of these results concludes that the AE method leads to correct decisions about the condition of the tank floor only 76.7% of the time with a probability of false alarm of 14.5% and a probability of missed detection of 8.8%. Even the correct decisions are not easy to determine because false alarms and missed detections happens for all grades except A.

When the results of the AE test indicate an A grade, there is a high level confidence that the rate of corrosion of the tank is low and no maintenance or repair of the tank is required. This accounted for 30.5% of the tanks evaluated, i.e., about 1 in 3 tanks tested. Furthermore, when the results of the AE test indicate a B grade, there is also a high level of confidence about the rate of corrosion being low with no maintenance or repair required, but at least 4, and up to 6, of the 41 tests results classified as a B grade are actually missed detections. It is difficult to determine how to interpret the C grade and the FU3 test results, because as defined the FU3 should be equated to a D grade, but the results tend to show many of the FU3 tests are C grades. In general, for our analyses in Table 1, we have assumed about half of the FU3 test results are missed detections and half would be included with the FU1,2 test results as we might expect from the definitions.

Five of the D and E grades were actually assessed as FU1,2 tanks and were judged to be in very good condition, i.e., false alarms. Ten of the tests graded as a B were actually assessed as FU3 and FU4 where damage has occurred, i.e., missed detections. Thus, how the AE test results are used in the method of the present invention is very dependent on the actual results of the AE test. More reliability can be assigned to the AE test results when a local UT floor thickness measurement is used to help interpret the results. Also, more reliability can be assumed if a more advanced signal processing method is used to determine the grade.

As stated above, strong statements can be made when an A or B grade is determined, particularly for an A grade. This is not the case for D and E grades, because there are almost as many tanks in need of repair and maintenance as prescribed by FU4 that receive a B or C grade vice a D or E grade. If the AE test results indicates a problem, you would be correct only 38.1% of the time. Similarly, if the AE results were A, B, or C, you would miss 9 of the 123 tanks (7.3%) in need of serious maintenance and repair and possibility more if the tanks with a C grade need some repair. Thus, we would consider the results of a previous API 653 inspection to be more reliable than a current AE inspection if the results of the AE test were D or E.

Some general conclusions about the condition tanks in general can be made from Table 1, which can support the overall method of the present invention. First, 64.2% of the tanks tested need little or no maintenance or repair. Thus, there is almost a 2 in 3 chance that any tank that passes a Leak Test is in good shape. Second, 14.2% of the tanks tested need significant maintenance and repair. Thus, a Leak Detection Test will correctly identify 78.4% of the tank conditions. This leaves 21.6% as uncertain with more information needed to ascertain their true condition. In general, we would expect that almost all of these 21.6% of the tanks would pass a Leak Detection Test even though they still need some repair and/or some maintenance. Thus, some measurement of the tank floor condition is needed in addition to the AE test.

TABLE 1

Summary of the AE Corrosion Activity Tests [Source: Loo, (1999)]

| AE Grade | % of Tanks | Number of Tanks | Cum % of Tanks | FU1/2 | FU3 | FU4 | | FU1/2 | FU3 | FU4 | | Correct Decision | | Incorrect Decision | | False Alarms | | Missed Detections | |
|---|---|---|---|---|---|---|---|---|---|---|---|---|---|---|---|---|---|---|---|
| A | 30.5% | 45 | 30.5% | 100.0% | 0.0% | 0.0% | 100.0% | 45 | 0 | 0 | 45 | 45 | 100.0% | 0 | 0.0% | 0 | 0.0% | 0 | 0.0% |
| B | 27.5% | 41 | 58.0% | 76.0% | 14.0% | 10.0% | 100.0% | 31 | 6 | 4 | 41 | 31 | 75.6% | 10 | 24.4% | 10 | 24.4% | 0 | 0.0% |
| C | 25.0% | 37 | 83.0% | 38.5% | 48.5% | 13.0% | 100.0% | 14 | 18 | 5 | 37 | 23 | 62.2% | 14 | 37.8% | 9 | 24.3% | 5 | 13.5% |
| D | 7.5% | 11 | 90.5% | 18.5% | 45.0% | 36.5% | 100.0% | 2 | 5 | 4 | 11 | 6.5 | 59.1% | 5 | 40.9% | 3 | 22.7% | 2 | 18.2% |
| E | 95% | 14 | 100.0% | 21.0% | 21.0% | 58.0% | 100.0% | 3 | 3 | 8 | 14 | 8 | 57.1% | 6 | 42.9% | 0 | 0.0% | 6 | 42.9% |
| | 100.0% | 148 | | | | | 500.0% | 95 | 32 | 21 | 148 | 114 | 76.7% | 35 | 23.3% | 22 | | 13 | |
| | | | | | | | | 64.2% | 21.6% | 14.2% | 100.0% | 76.7% | | 23.3% | | 62.3% | | 37.7% | |

Cole and Gautrey [2002] described history of the AE method used in the Loo study (TANKPAC™ produced by Physical Acoustics) and included additional data and illustrations of the use of the method for ascertaining the condition of a tank and whether or not the time between scheduled internal inspections can be extended. Their Figure 10 increased the number of tanks used in Table 1 from 148 to 157; the results were very similar. In their Figure 11, they reported the results of a similar study by the French Institute of Petroleum for a sample population of 78 tanks with very similar results. Table 2 compares the results from Loo, Cole and Gautrey, and the French Institute of Petroleum and shows that they are very similar. The main conclusions hold: (1) tanks with AE reported grades of A and B (FU1,2) show very little or some maintenance and repair required, (2) tanks with AE reported grade of D and E showed large damage (FU4) with a high degree of maintenance and repair needed, (3) a small number of false alarms in which AE reported grades of D and E were actually in good shape (FU1,2) or not in very bad shape (FU3), and (4) no missed detections in which tanks in very bad shape (FU4) were reported in good shape. The strongest statements that can be made about the AE test is that if a test results in a grade of A or B, it should be in good shape. Conversely, if a tank is reported with a grade of D or E, it should be treated as such even though about half of the tanks in this category were actually in moderate to good shape.

of a leak detection test where a pass indicates the tank has not failed, and in-service measurements of the thickness and corrosion rate of the tank floor that will eventually need to be inspected.

It is the object of this invention to provide a method and apparatuses for accurately and reliably computing or updating the time until or between out-of-service inspections using a risk-based inspection (RBI) approach, the results of a leak detection test where a pass indicates the tank has not failed, and in-service measurements of the thickness and corrosion rate of the tank floor at one or a few locations, and a means of making a spatial estimate of the thickness and corrosion rate for the entire tank floor from the in-service measurements of tank floor thickness and corrosion rate using the tank floor inspection results from previous out-of-service floor inspections, all for the tank that eventually will need to be inspected.

It is the object of this invention to provide a method and apparatuses for accurately and reliably computing or updating the time until or between out-of-service inspections using a risk-based inspection (RBI) approach, the results of a leak detection test where a pass indicates the tank has not failed, and in-service measurements of the thickness and corrosion rate of the tank floor at one or a few locations, and a means of making a spatial estimate of the thickness and corrosion rate for the entire tank floor from the in-service measurements of tank floor thickness and corrosion rate using the tank floor inspection results from the results of

TABLE 2

Summary of the AE Corrosion Activity Test Results from Three Sources

| | Loo (1999): 148 Tanks | | | French Institute of Petroleum (2002): 78 Tanks | | | Cole and Gautrey (2002): 157 Tanks | | |
|---|---|---|---|---|---|---|---|---|---|
| AE Grade | FU½ | FU3 | FU4 | FU½ | FU3 | FU4 | FU½ | FU3 | FU4 |
| A | 100.0% | 0.0% | 0.0% | 100.0% | 0.0% | 0.0% | 100.0% | 0.0% | 0.0% |
| B | 76.0% | 14.0% | 10.0% | 89.0% | 11.0% | 0.0% | 80.5% | 11.5% | 8.0% |
| C | 38.5% | 48.5% | 13.0% | 22.0% | 18.0% | 60.0% | 36.0% | 40.0% | 24.0% |
| D | 18.5% | 45.0% | 36.5% | 19.0% | 29.5% | 51.5% | 15.0% | 45.0% | 40.0% |
| E | 21.0% | 21.0% | 58.0% | 3.0% | 14.0% | 92.0% | 12.0% | 26.0% | 62.0% |

3.0 SUMMARY OF THE INVENTION

It is the object of this invention to provide a method and apparatuses for accurately and reliably computing or updating the time until or between out-of-service inspections using a risk-based inspection (RBI) approach and the results of a leak detection test where a pass indicates the tank has not failed.

It is the object of this invention to provide a method and apparatuses for accurately and reliably computing or updating the time until or between out-of-service inspections using a risk-based inspection (RBI) approach, the results an in-service AE corrosion activity test where the results show little or no corrosion activity, all for the tank that eventually will need to be inspected.

It is the object of this invention to provide a method and apparatuses for accurately and reliably computing or updating the time until or between out-of-service inspections using a risk-based inspection (RBI) approach using Bayesian statistical analysis and the results of a leak detection test where a pass indicates the tank has not failed.

It is the object of this invention to provide a method and apparatuses for accurately and reliably computing or updating the time until or between out-of-service inspections using a risk-based inspection (RBI) approach using Bayesian statistical analysis, the results of a leak detection test where a pass indicates the tank has not failed, and in-service measurements of the thickness and corrosion rate of the tank floor that will eventually need to be inspected.

It is the object of this invention to provide a method and apparatuses for accurately and reliably computing or updating the time until or between out-of-service inspections using a risk-based inspection (RBI) approach using Bayesian statistical analysis, the results of a leak detection test where a pass indicates the tank has not failed, and in-service measurements of the thickness and corrosion rate of the tank floor at one or a few locations, and a means of making a spatial estimate of the thickness and corrosion rate for the entire tank floor from the in-service measurements of tank floor thickness and corrosion rate using the tank floor inspection results from previous out-of-service floor inspections, all for the tank that eventually will need to be inspected.

It is the object of this invention to provide a method and apparatuses for accurately and reliably computing or updating the time until or between out-of-service inspections using a risk-based inspection approach based on a Bayesian statistical analysis, the results of a leak detection test where a pass indicates the tank has not failed, and in-service measurements of the thickness and corrosion rate of the tank floor at one or a few locations, and a means of making a spatial estimate of the thickness and corrosion rate for the entire tank floor from the in-service measurements of tank floor thickness and corrosion rate using the tank floor inspection results from the results of an in-service AE corrosion activity test where the results show little or no corrosion activity, all for the tank that eventually will need to be inspected.

It is also the object of invention to provide an in-service measurement of floor thickness using an ultrasonic transducer (UT) sensor on a staff to position the sensor on the bottom of the tank.

It is also the object of invention to provide an in-service measurement of the corrosion activity of the tank floor using one or more acoustic emission (AE) submerged in the liquid in the tank.

The preferred methods and apparatuses of the present invention can be used to compute or update the time until the next out-of-service inspection of an aboveground storage tank (AST) or a bulk underground storage tank (UST) based on a risk based inspection (RBI) approach using a Bayesian analysis approach and a leak detection test with a passing result. Longer time intervals with increased accuracy and reliability can be achieved with one or more of the following: in-service measurements of tank floor thickness and corrosion rate at one or a few locations, the results an in-service acoustic emission (AE) corrosion activity test where the results indicate little or no corrosion, and one or more previous out-of-service inspections where the thickness and corrosion rate is determined from many tank floor thickness measurements over the entire floor. The alternative method only uses the results of the AE corrosion activity test to extend the results of the in-service thickness and corrosion measurements. Another alternative method only uses the results of previous out-of-service tank floor inspections extend the results of the in-service thickness and corrosion measurements. The methods and apparatuses of the current invention can be used to estimate the time interval to the next inspection as described in API 653 or similar standards such as API12R1, STI SP001, and other out-of-service inspections recommended practices and methods.

The preferred method of measuring thickness of the tank floor is to use one or more ultrasonic (UT) thickness probes on a vertical staff that is inserted into the tank from an opening at the top of the tank. The preferred method of performing AE corrosion activity test is by placing one or more, and preferably three or more, sensors in the product inside the tank on the staff, where at least one of the sensors is at a different elevation than the other sensors. All of these proposed measurement procedures have been used for tank integrity assessments for many years, but they have not been used for in-service inspections or in combination to estimate the thickness and corrosion rate for the entire tank floor. The preferred method and apparatus of the present invention is comprised of a mass-based leak detection test (Vista Precision Solution's LRDP) with a reference sensor tube inserted into the tank at a convenient opening from the top of the tank. Alternatively, an electrical resistance tomography (ERT) method with stakes placed around the perimeter of an AST can be used for detect of leaks from the tank. For double-bottom tanks, a pressure decay method is the preferred method (Vista Precision Solution's Double-Bottom Pressure Decay Method).

IN THE DRAWINGS

DESCRIPTION OF THE PREFERRED EMBODIMENT

Figure 1:
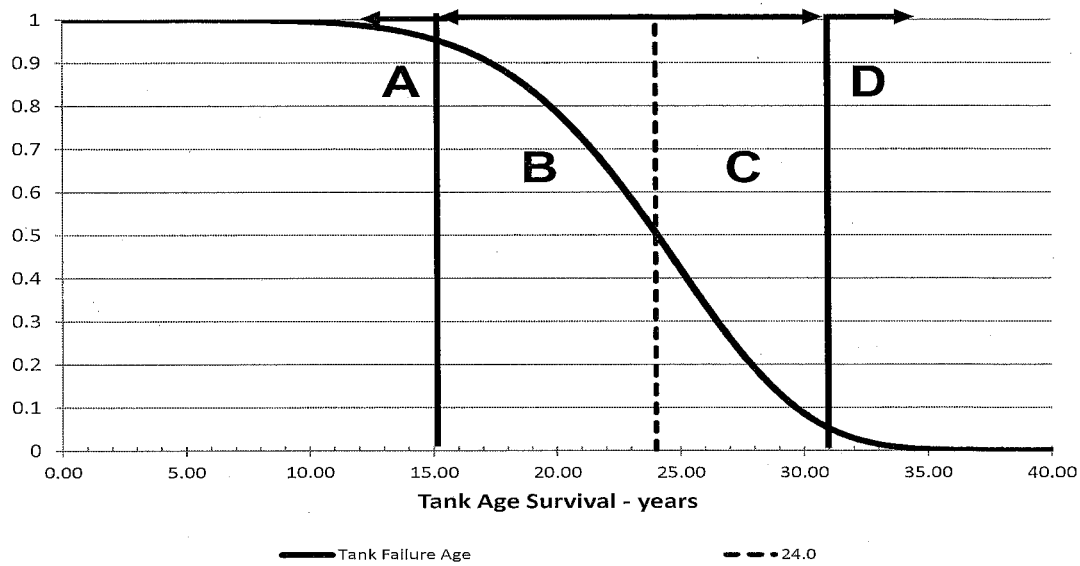
FIG. 1 illustrates a Tank Age Survival Cumulative Frequency Distribution (CFD) based on a Weibull Density Model.

In U.S. Pat. 9,228,932 Maresca, et. al., teaches a risk-based method for computing or updating the internal inspection interval using a Bayesian approach. In U.S. Pat. 9,766,175, Maresca, et. al., describes methods and apparatuses for in-service measurement of the bottom thickness and corrosion rate of a tank bottom.

This specification focuses on the statistical distributions required to estimate the time until the next out-of-service inspection of the tank floor should be considered or needs to occur. The underlying statistical approach is very similar to how the insurance industry determines the life expectancy of people or special groups of people, except the proposed invention does forecast the life expectancy or survival rate of the tank. Rather it computes the time between the same survival probabilities based on a statistical concept we define as Equivalent Risk.

The probability of a tank failing at a certain age is determined, as it is for people, from a life expectancy probability distribution developed from tanks that have failed, where failure for this method is defined as a tank that is leaking through the floor or bottom of the tank. Unlike people that die, it is not easy to determine when a tank has died, i.e., failed. The life or death of a tank can be determined from a leak detection test. If a tank passes a leak detection test, it is deemed to be alive. Like people, the longer a tank has survived, the longer its life expectancy.

The probability of the life expectancy of a tank or a person can be computed given the age of a tank, or a person using a Bayesian statistical approach similar to what the life insurance industry uses for estimating life expectancy and insurance premiums. In all cases, the probability of survival is always higher than the original tank probability distribution given the life expectancy estimate is based on the age of the tank. The extension time interval (ETI) is set equal to the time it takes for the updated Bayesian probability of survival to fall to the same level as the probability of survival at the time the tank was scheduled for the internal inspection. Furthermore, during this ETI, the probability of survival remains higher than what it was at the time when the tank was scheduled for an internal inspection.

API 653 describes the minimum requirements for maintaining the integrity of welded or riveted, non-refrigerated, atmospheric pressure, aboveground storage tanks (ASTs) after they have been placed in service and addresses inspection, repair, alteration, relocation, and reconstruction. API 653 covers the foundation, bottom, the shell, the roof, attached appurtenances and nozzles to the face of the first flange, first threaded joint, or first welded end connection. API 653 is also used for internal inspection bulk underground storage tanks (USTs). API RP 12R1 ("Setting, Maintenance, Inspection, Operation, and Repair of Tanks in Production Service") describes the minimum requirements for crude oil production tanks. Most tanks are managed today through the use of regular internal inspections.

Most large ASTs containing petroleum products that require internal inspections are between 10 and 100 meters in diameter. These vertical, cylindrical storage tanks have steel bottoms or floors that usually rest on soil or prepared backfill and are subject to leakage from holes or cracks that (a) existed when the tank was initially placed into service, or (b) developed in the floor due to corrosion over time. Unless these tanks have a release prevention barrier, as described in API 650 ("STD 650 Welded Tanks for Oil Storage") Appendix I, if they leak, petroleum can flow into the soil beneath the tank over long periods of time, creating contamination of the environment, and generating significant liabilities for their owners.

To minimize the possibility of a leak in the tank floor, most large petroleum tanks are internally inspected according to API 653 at an interval between inspections that is sufficiently short to prevent corrosion from developing holes in the floor of an AST (or the floor or shell of a bulk UST) before the next inspection. While there may be other requirements for setting the inspection interval, the corrosion rate in the tank floor is usually the key driver.

To perform an internal inspection and to assess the level of corrosion in the floor of an AST, the tank must be taken out of service so that the fuel can be removed, the tank can be cleaned, and the internal measurements can be made. This is an expensive and time-consuming activity. Corrosion on the shell and roof of the tank can be detected and assessed without taking the tank out of service, and while part of an internal inspection, is performed more frequently. The tank must be taken out of service for an internal inspection to gain access to the tank bottom so that the condition of the floor can be assessed through a series of floor thickness and vacuum box leak measurements. The level of corrosion is assessed and any holes detected or areas of serious corrosion are repaired. An estimate of the maximum corrosion rate is made for the tank floor based on change of the floor thickness since the last set of tank floor measurements were made and is the basis for setting the interval until the next internal inspection following API 653.

API 653 provides prescriptive time intervals ranging from 10 years up to a maximum of 20 years between internal inspections based on the estimated corrosion rate. The methodology for setting these time intervals is very conservative and is usually based on the corrosion of the top and bottom of the tank floor. Furthermore, the methodology assumes a linear corrosion rate over time. Yet, we know that the corrosion rate for a new tank is considerably higher during the first few years of service (2X to 10X) than it is for later years. Thus, the API 653 inspection intervals are conservative and the life expectancy of the tank bottom can be significantly longer than estimated. There are also many reasons not to over inspect these petroleum storage tanks. One of course, is the high cost of performing the inspection and the revenue lost because the fuel transfer operations have been temporarily shut down. Additionally, the environment is better protected, because significant pollution occurs any time the tank is taken out of service. Because the corrosion rate is only an estimate, is very conservative, and is used over very long time interval (10 to 20 years), it is highly likely that the next inspection could actually be delayed without environmental or maintenance consequences.

Risk-based inspection methods provide guidance about how to optimize the internal inspection interval for storage tanks. The methodology presented below is a new approach to managing the life expectancy of a tank and the interval between inspections. It follows the well-known actuarial life expectancy methods used by the life insurance industry to predict life expectancy for men and women so their life insurance rates can be set to insure that the company is profitable. It applies a new diagnostic tool which allows one to recalculate the probabilities of tank failure consistent with the risk-based inspection (RBI) approach of API 580 and API 581. Moreover, since the risk is equivalent to the risks that one faces with the application of API 653, no particular tank specific RBI analyses are required other than those presented below. This new method requires that the tank PASS a third-party approved leak-detection test. This test is required, not for compliance purposes, but to confirm that the tank is "alive," i.e., that the corrosion of the tank bottom has not produced any holes. This method is limited only to those tanks in which corrosion rates govern the internal inspection interval.

The method allows the tank owner or operator to evaluate, at the time that a tank is scheduled to be taken out of service for an internal inspection, whether or not the internal inspection can be postponed for a number of years without any additional risk of tank failure. This can be done if the life expectancy or survival probability distribution of the tank is known or can be estimated. The tank owner or operator can estimate directly the extension time interval or ETI, from this probability distribution using conditional probabilities and the concept of equivalent risk. The calculations can be done in a spreadsheet.

The use of ETI at the time of a scheduled API 653 internal inspection has the following advantages:
- It significantly reduces pollution, which is significant every time a tank is opened to the atmosphere drained and cleaned so that the bottom floor can be inspected
- It keeps the tank in service with no loss of operations or revenue
- It saves money, both in terms of the (1) actual expenses associated with taking the time out of service, cleaning the tank, inspecting the tank and placing it back in service, and (2) the lost revenues associated with the loss of operational service of the tank The question for the tank owner or operator is, "What is the life expectancy of the tank given that the tank has attained a certain age. Let's assume that when the tank was installed, the average life expectancy of the tank was 25 years and the age of the tank scheduled for an inspection is 20 years old. We know immediately that the life expectancy or survival age of the tank has increased, because it has already made it to 20 years. It has avoided those unlikely but real failure mechanisms that might have led to an early demise of the tank. We also know that the survival probability distribution, which might indicate a probability of 60% cannot be correct. In fact, the probability of survival for this 20-year old tank is nearly 100%. This is easy to accept if you ask the question about what the probability of surviving another second, minute, hour, or day is for the tank. It is nearly 100% and not 60% as indicated by the survival probability distribution. Of course, over time, the probability of survival for the tank will again approach the survival probabilities of the overall tank.

The same life expectancy analogy holds for people. If you are a man with an average life expectancy of 78 years and you are 75 years old, the life insurance actuarial tables will say that you know have a life expectancy of 84 years given that you are 75 years old. Your life expectancy has increased because you have made it to 75 years old and have escaped some of the causes of death that may have caused death.

We can compute how long it takes for the survival probability of a tank that is 20 years old to attain a survival probability of 60%. At that point, the tank has the same risk of survival as indicated by the distribution at 20 years. Thus, we can postpone the internal inspection by this amount of time without incurring any additional risk of failure. We can compute this ETI using conditional probabilities following Bayes Theorem. At a minimum, the following information is needed to implement this method:

(1) A estimate of the cumulative frequency distribution ($S(y) = CFD_{survival}$) of the survival of a tank, or Life Expectancy of the tank as a function of age, y, where $F(y) = 1 - CFD_{survival}$ is the $CFD_{Failure}$ of a tank (2) A Leak Detection with a PASS, whose primary purpose is to show that the tank has integrity, i.e., in terms of a people life expectancy analogy, it is alive.

(3) The age of the tank at the time of the Leak Detection Test, the design life of the tank, and the internal inspection interval.

If the following information is also available, this method provides procedures to develop the $CFD_{survival}$ for use by the tank owner or operator.

(4) One or more local measurements of the bottom thickness of the tank at one or more locations in the tank to develop the mean thickness, $T_{Meas\ at\ Age}$, and $CR_{Meas\ at\ Age}$ at these locations.

If one or more of the following sources of information about the spatial distribution of the floor thickness (and corrosion rate) for the entire floor is available, longer ETI estimates are possible, because the applicability of the local floor thickness measurement made in (4) to the entire tank floor can be better assessed.

(5) (a) acoustic emission (AE) corrosion activity test showing no or little corrosion activity, (b) a previous API 653 internal inspection, or equivalent, or (c) a robotic inspection of the tank floor.

The key to the implementation of this method is to generate a Tank Age Survival CFD Distribution, S(y). This Tank Age Survival CFD Distribution is determined from the Tank Failure Age CFD Distribution (F(x)), where $S(y) = 1 - F(y)$. There are many ways to derive such a function, but to facilitate the implementation of this method, we provide one approach in sufficient detail that can be used to implement this method. The approach is based on actual corrosion data obtained over an 18-year period and allows the tank deferral interval to be computed without having to develop CFDs based on tank failures. This method provides an approach to generate S(y) from (1) a measurement of floor thickness in the tank under consideration for deferral and (2) the measured standard deviation of the corrosion rate from a large corrosion data base for buried steel. Ultrasonic (UT) is a common method for measuring floor thickness, and we will refer to it throughout this method, but any sensor capable of measuring floor thickness to the nearest 1 mil will suffice. The corrosion rate represented by the UT thickness measurement of the floor is computed from the time of the last known measurement of floor thickness. In general, this would be either the last API 653 internal inspection, or if such an inspection has yet to be done, the original floor thickness of the tank at the initial installation.

It is convenient to use the cumulative frequency distribution (CFD) of the survival tank age, $S(y) = 1 - F(y)$, although it is more descriptive at the beginning to show the density function as illustrated in FIG. 1. F(y) describes the cumulative probability of a tank failing, which is the cumulative summation of the area under the density function in FIG. 1 and illustrated in FIG. 2. We use 1 - F(y) to describe the probability of survival, S(y), as illustrated in FIG. 3. This distribution indicates that if your tank is brand new, the average life expectancy of a tank is 25 years where some tanks can have longer life expectancies and some can have shorter life expectancies. The probability of survival of the tank is 1 — the probability of tank failure and the probability of survival of a brand new tank for all intensive purposes is 100%. While not strictly true, because a bad installation could lead to a premature failure of the tank immediately after installation, we will ignore this, because we generally apply this methodology at or near the time of the first internal inspection, which may involve a tank that is 10 to 20 years old. For simplicity of application and without loss of accuracy, we will assume that the probability of survival at 0 years is 100%. Thus, all of the statistical models considered for S(y) will be truncated at the lower end and be unbounded at the upper end. For convenience, we will use a lower bound set at 1 mpy.

When F(y) or S(y) is generated from a statistical model of corrosion rate, x, (i.e., floor thickness) measurements, a transformation of the statistical distribution is required, because the random variable, x, is not Failure Age (A(y)) but Corrosion Rate (CR (x)), which is a random variable that is inversely proportional to the random variable Age(x) and is defined as the thickness of the floor left ($T_{Left}$) before failure divided by CR (i.e., Age (y) = $T_{Left}$ / CR(x)). Once we have a distribution for S(y), we can make an estimate of the Extension Time Interval (ETI).

The use of the Risk Based Inspection (RBI) methods in API 580/581 to manage petroleum AST inspections and maintenance to determine the time between inspections is recently gaining acceptance. These programs are expensive to implement and depend and require the use of previous API 653 inspections. This method can be applied to individual tanks, is simple to implement using existing inspection methods, depends on the use of current data for assessing tank integrity, and is significantly less expensive than the current approaches. Furthermore, it is based upon the use of proven survival and reliability methods used in insurance, manufacturing, and quality control. More specifically, this method is directly analogous to the development and use of life expectancy tables by the life insurance industry.

The present invention provides methods for estimating or updating the time until the next out-of-service tank inspection needs to be done based on the risk of failure of the floor or bottom of an aboveground storage tank (AST), which usually is determined by a minimum acceptable thickness of the floor of the tank, which is typically 0.10 in. for tanks without a release prevention barrier (RPB) and 0.05 in. for tanks with a RPB. It can also be used for underground tanks with vertical walls and a flat bottom. The method requires a set of in-service inspection measurements to be performed so that the risk of failure can be estimated as a function of time. The method of the present invention provides a method for implementation based on the generating S(y) from an UT measurement of floor thickness in the tank under consideration for deferral and the measured standard deviation of the corrosion rate from a large corrosion data base for buried steel. Based on these measurements, the time until the risk is the same as expected at the scheduled inspection is computed based on equivalent risk. Given that it can be shown that the tank has not failed at the time of the assessment, the time until the tank experiences the same level of risk is computed.

The statistical approach being used to estimate the time to the next out-of-service tank floor inspection based on the concept of equivalent risk. When the age of the tank has a survival rate of over 95%, a deterministic estimate of the time internal is made. When the age of the tank has a survival rate of less than 5%, it is recommended that an out-of-service inspection be performed. The 95% and 5% survival rate values are selected, because it is difficult to accurately model or determine the survival statistics at these probabilities unless a lot of data is available. The method is implemented using a Weibull probability model for the life expectancy and survival rate probabilities of a tank bottom.

Estimate the Time Interval to the Next Out-of-service Tank Floor Inspection Using Equivalent Risk. The method uses a Bayesian risk-based inspection (RBI) method to estimate the time to the next out-of-service tank floor inspection based on the concept of equivalent risk. The method is used for managing scheduled internal inspections of Aboveground Storage Tanks (ASTs). The method can be used for determining the amount of time that a field-erected petroleum AST, which contains refined petroleum products and is scheduled for an internal inspection following API 653, or another applicable practice, can be deferred without increasing the risk of tank failure. During the entire deferral period, the survival probability of the deferred tank is greater than and remains greater than, the survival probability at the time of the scheduled internal inspection. This method is compliant with the principles and criteria of a risk-based inspection as described in API 653 (Edition 4), which includes the principles and criteria in API 580 and API 581.

This method can be used to safely and cost effectively manage and prioritize tank inspections scheduled for internal inspections while minimizing the potential for environmental damage, reducing the actual cost of inspections and maintenance, and maximizing in-service tank operations. The method addresses the probability of failure of a tank and the consequences of a failure as prescribed in the API 580 and 581 Recommended Practice. Since the consequence of the failure of the tank is identical to (or less than) the consequences of a failure of the tank at the time of the scheduled API 653 internal inspection, the risk can be determined from the probability of failure of the tank at the time of the inspection. This method can also be applied to bulk cylindrical, vertical-wall underground storage tanks (USTs) containing refined petroleum products, as well as ASTs following API RP 12R1 for field-erected production ASTs or STI SP001 for shop fabricated ASTs.

The method assumes that the corrosion of the tank floor controls the life expectancy of the tank and requires, at a minimum, the conduct of two tank measurements: (1) a passing leak detection integrity test conducted with a third-party evaluated method following an EPA evaluation protocol and (2) a measurement of tank floor thickness using an ultrasonic (UT) sensor (or equivalent) at a minimum of one location in the tank. An external inspection, which is routinely performed as part of API 653 and does not require the tank to be taken out of service, can be used to determine whether or not the tank has external problems that must be dealt with immediately, or the tank can be considered for an inspection deferral. If it is determined that the external shell, the roof, or other appurtenances need or will need maintenance in the next year, then an internal inspection in accordance with API 653, or other equivalent practices, should be performed as scheduled and no deferral should be considered. If not, with a passing leak detection integrity test and a measurement of floor thickness, an estimate or update the time to the next out-of-service inspection of the tank floor can be determined using this method.

The method requires the generation or selection of a tank survival probability distribution, F(y), which is used to compute ETI in which the risk of failure during the entire ETI is less than it was at the time of that the inspection interval is being determined or updated, i.e., the probability of survival of the tank is greater during the entire time between the assessment and the time of the scheduled inspection. This method incorporates the same statistical principles used by the life insurance industry to determine life expectancy of people, but instead of predicting the life expectancy of a tank, it only uses them to estimate the time period that a tank will survive at the same risk or survival probability level given that the tank has survived to its current age.

The sole purpose of the leak detection integrity test is to determine whether or not the tank has integrity, i.e., whether or not it is alive, and has survived until the scheduled inspection. The leak detection integrity test must be performed with a method that has been evaluated by a third party following EPA standard protocols to determine its performance in terms of probability of detection ($P_D \geq 95\%$) and probability of false alarm ($P_{FA} \leq 5\%$). If the tank passes the test, then it can be concluded that the tank has survived (i.e., has not already failed) and the deferral time intervals can be computed. The floor thickness measurement is used to make an estimate of corrosion rate to use in developing or selecting a survival probability distribution, F(y), and to determine if longer deferral periods are warranted.

The method describes several procedures that can be used to compute the tank survival probability distribution given that the tank has survived to the scheduled inspection (S(y/TA). This distribution is computed from the underlying probability distribution for all tanks with similar failure and/or corrosion characteristics, S(y) = 1 - F(y). The method describes two ways to generate S(y). One is to develop it using corrosion rate data and the other is to develop it from tank failure data, where failure can be defined as a leak or more conservatively as some minimum bottom thickness. This method focuses on development of the survival probability cumulative distribution function (CDF) of a tank, S(y), from a cumulative frequency distribution (CFD) of corrosion rate data, CR(x), because reliable data on tank failure data is more difficult to obtain and to interpret. The method includes a CR(x) for different burial times for buried bare steel that was obtained from corrosion data at 47 locations throughout the US. The methods suggests using a CR(x) obtained 8 to 10 years after burial for any inspection time, because it is conservative from both a corrosion rate basis (longer burial times will have a smaller corrosion rate) and material type (coated steel will have a longer life).

Figure 2:
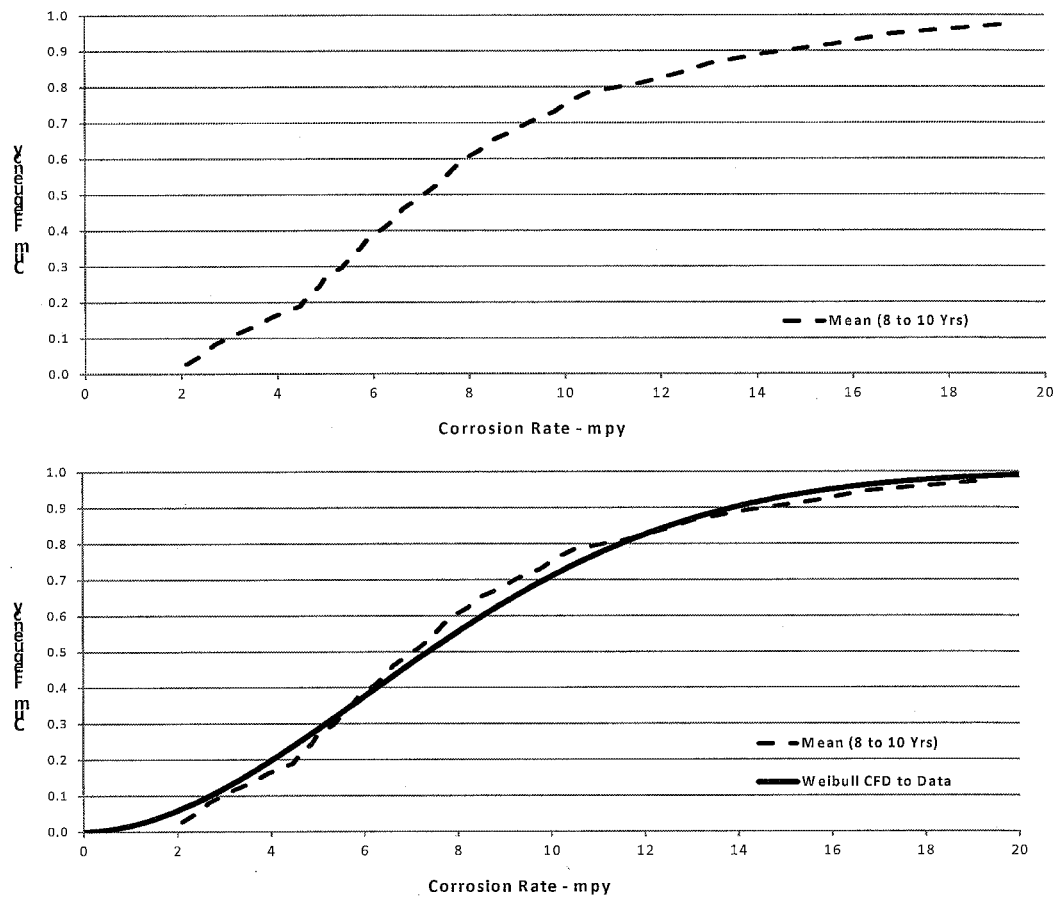
FIG. 2 illustrates a cumulative Frequency Distribution (CFD) of the corrosion rate data and a Weibull Cumulative Distribution Functions (CDFs) fit to the corrosion rate CFD with a mean of 7.99 mpy and a standard deviation of 4.37 mpy.
Figure 3:
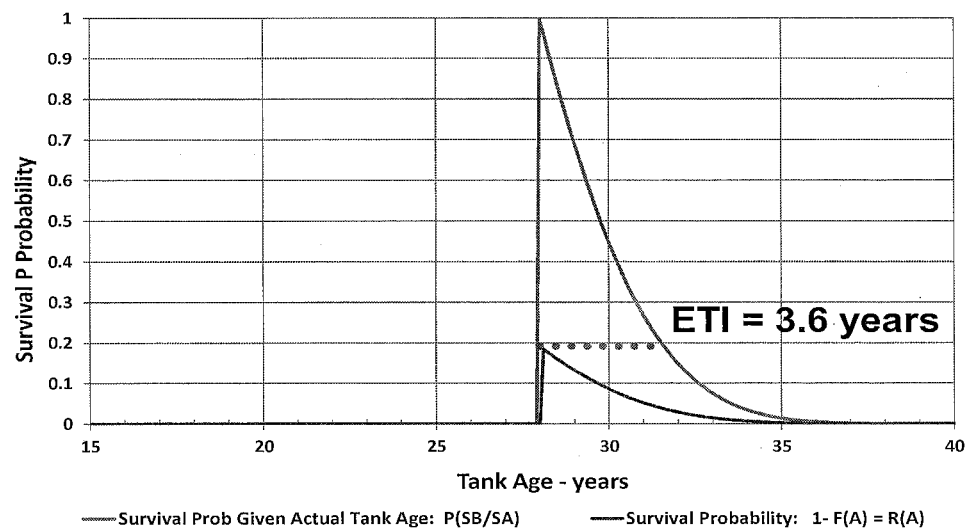
FIG. 3 illustrates a Tank Deferral Time for a Weibull Tank Age Survival CFD in Region C.
Figure 4:
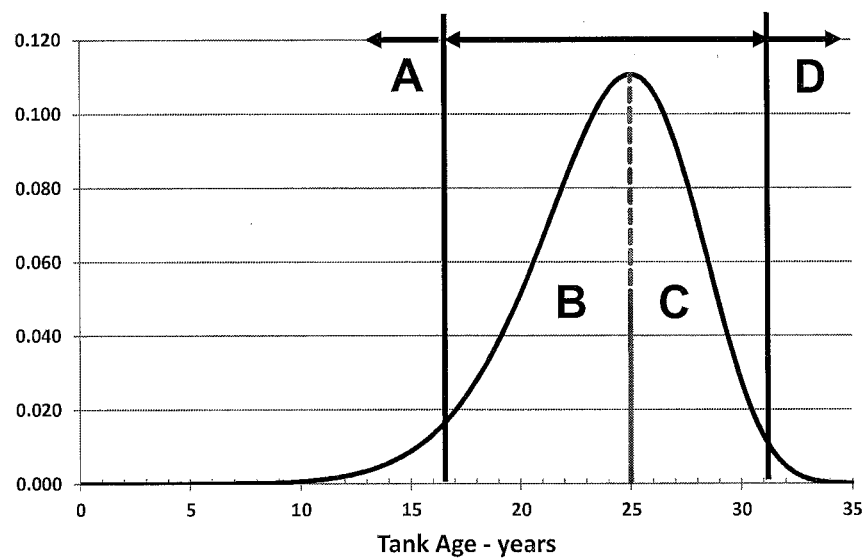
FIG. 4 illustrates a Tank Age Density Function based on a Weibull Model.

FIG. 1 illustrates a CDF for tank survival age S(y) developed using the corrosion rate CFD obtained 8 to 10 years after burial shown in FIG. 2. FIG. 2 shows the raw CFD (top) and a curve fit to the raw CFD using a Weibull CDF probability model (bottom) with the mean and standard deviation used to define the shape and scale parameters U and alpha. Once S(y) is determined from the Weibull CDF, the conditional probability distribution of survival S(y/TA) can be computed and is superimposed on S(y) in FIG. 3. Using S(y/TA), the ETI time interval, which is shown as the dotted blue line and is required for S(y/TA) to drop from a survival probability of 100% to the same survival probability at the time of the scheduled inspection, is computed.

The method provides the equations to use to determine ETI in the 10-Step procedure. Graphs illustrating the solution of these equations that were generated in a spreadsheet are shown in FIGS. 1 - 6. The CDF in FIG. 1 illustrates the life expectancy of the tank with a mean life expectancy of 25 years. The design life would normally be computed assuming a minimum remaining thickness at the design life; thus, if a minimum thickness of 0.10 in. were assumed, this would indicate an expected corrosion rate of 6 mpy. This CDF provides an estimate of the life expectancy of tanks at the time of installation, but needs to be updated annually like the life expectancy of people for each age that the tank survives, for this application, for the age of the scheduled internal inspection. FIG. 3 illustrates the life expectancy CDF for the tank given that the tank is 28 years old, and, like an analogous CDF for people, is based on the conditional probability of survival at that age. The plot in FIG. 3 only shows the survival CFD for tanks 28 years and older.

Three things are notable in FIG. 3 about S(y/TA). First, the probability of survival of the tank at 28 years old, given the tank is 28 years old, is 100%, i.e., it is highly probable that the tank will survive until tomorrow. The underlying mathematics indicates that this is true for any distribution and that no matter what distribution is provided, it has a finite mean and variance and that the conditional probability of survival, given a component has survived to a specific time or age always exceeds the survival probability initially. Second, the survival probability drops over time and approaches the survival probability of the underlying probability distribution over time, i.e., in this case, 36 years. ETIs can range between 1 and 5 years, typically 2 to 4 years, depending on the age of the tank relative to S(y). Third, for the entire ETI period, the survival probability is higher than the survival probability for the tank at the scheduled inspection, which means there is less risk of failure for the tank during the entire ETI period than it was for the tank when it was scheduled for inspection. In FIG. 3, for a period of 3.6 years, the survival probability is higher than the survival probability for the tank at 28 years, which means there is less risk of failure for the tank at 31.6 years than it was for the tank at 28 years. The ETI is based on this principle of Equivalent Risk.

This method also provides for the possibility of longer tank deferral intervals (TDI) than ETI if additional data and information about the spatial condition of the tank floor is obtained and combined with the local floor thickness measurement described above. The additional data and information may include an Acoustic Emission (AE) Corrosion Activity Test, a previous API 653 internal inspection, or a previous robotic inspection of the tank floor, but these additional measurements are not required to implement the method. If spatial information is not available, then The TDI = ETI.

This method currently limits duration of the deferral period to 50% of the internal inspection period (e.g., 5 years for a 10-year internal inspection period). If the age of the tank is less than the design age, two deferral periods are possible; if the tank is older than the design life, then only one deferral period is permitted. The method is highly conservative and is based on empirical data collected at the time of the scheduled internal inspection.

The decisions, measurements, and computations required to implement the method in a 10-step method. Step 1 presents the criteria for whether or not the tank qualifies for a deferral, and Step 10 presents the computation of the TDI for the tank. The method describes the flow chart and the ten steps in more detail. Knowledge of probability theory is not required to implement the method if a graphical solution is used to perform all of the required computations to compute ETI given that the tank passes a third-party approved leak detection test, the corrosion rate data provided by the method is used, and the following information is entered into the worksheet: (1) mean measurement of the floor thickness in mpy, the age of the tank, (2) the previous measurement of floor thickness and the age of the tank at this measurement, (3) the current age of the tank. If no spatial information is provided then TDTI = ETI. If spatial information is provided, the worksheet will compute TDTI by combining ETI and α in accordance with Table 3.

10-Step Method The 10-step method is described below. It allows for S(y) to be implemented using corrosion rate data or tank failure data. The same data is required for the tank that is being considered for an inspection deferral, but the UT bottom thickness measurement is used differently. The mean bottom thickness, $T_{Meas\ at\ Age}$, and the mean corrosion rate measurement, $CR_{Meas\ at\ Age}$, can be used to generate S(y) directly from statistical models of corrosion data or to select a statistical model of tank failures based on a corrosion category.

In order to implement the method, the following measurements are required:

(1) A Leak Detection Test with a PASS. This shows that the tank has not failed, i.e., the tank is alive, (2) One or more local measurements of the bottom thickness of the tank to at least ⅓ of the minimum acceptable thickness (typically, to the nearest 0.001 in. (1 mil) or 0.002 at one or more locations in the tank using a UT sensor, or equivalent, and (3) An external inspection of the tank following the procedures in API 653.

If additional measurements are made or if additional information or data is available that will allow the distribution of bottom thickness or corrosion rate to be assessed across the entire tank floor, then longer inspection time intervals are possible. This method includes the following three types of spatial data sets:

Spatial measurement of the bottom thickness or corrosion rates across the entire tank floor, (a) Previous API 653 internal Iispection, or equivalent, and (b) Acoustic Emission (AE) corrosion activity test showing no or little corrosion activity, i.e., a test result of Grade A and/or possibly B.

There are numerous advantages to the deferral of an inspection until it is really needed. They are:

It keeps the tank in service with no loss of operations or revenue and no more risk of failure than at the time of the scheduled inspection.

It saves money, both in terms of the (1) actual expenses associated with taking the time out of service, cleaning the tank, inspecting the tank and placing it back in service, and (2) the lost revenues associated with the loss of operational service of the tank.

It significantly reduces pollution, which is significant every time a tank is opened to the atmosphere drained and cleaned so that the bottom floor can be inspected.

Definition of Variables. A list of the variables used in the 10-step method are described below:

$T_{Min\ at\ Age}$: The minimum thickness of the tank flow when it is scheduled for an internal inspection c: $c = T_{Meas\ at\ Age} - T_{Min}$, where $T_{Min\ is\ generally\ equal\ to\ 0.05}$ or 0.1 in. for the minimum allowable floor thickness x: corrosion rate in mpy, where x = c/y y: corrosion rate in mpy, where y = c/x $T_{Min}$ $T_{Meas\ at\ Age}$ $CR_{Meas\ at\ Age}$ $T_{Min\ at\ Age}$ $CR_{Max\ at\ Age}$ $T_{Original}$ $\alpha_1 = t_{API\ 653-1}$ $t_{API\ 653-1}$Time to $T_{Min}$ $CR_{Max\ at\ Age}$ $\alpha_2 = t_{API\ 653-2}$ $t_{API\ 653-2}$ = Time to $T_{Mean\ Age}$ $T_{Mean\ Age}$ $CR_{Max\ at\ Age}$ ETI (Extension Time Interval):

TDTI (Time Deferral Time Interval):

A summary of the ten steps to implement the method is presented below. It should be recognized that there can be many variations of this procedure, which depends on how conservative the computation is done, the reason and time of the assessment of the time interval to an out-of-service internal inspection. The description below assumes that the tank is scheduled for an out-of-service inspection and the time interval is being updated. If the updated time interval indicates that the tank does not need to be taken out of service, the time interval to the next inspection is called a deferral time. If the assessment is done at the time of a scheduled out of service inspection, only one additional assessment is recommended before the tank be taken out of service. Modifications to the method presented below will be made, for example, if (1) the tank is not scheduled for an out-of-service internal inspection, which may be the case if the method is being applied to a new tank after it has been in service for a few years so that a corrosion rate can be measured/estimated, or (2) if the tank is within the time interval until it should be inspected, but is in need of a 10-year re-assessment because the interval was computed using an RBI method, Step 1 - Prescreening To Determine if the Method Can Be Applied: The objective of the prescreening is to determine if the method is applicable. The Prescreening takes into account the age of the tank, whether or not the tank is scheduled for an internal inspection, the number of previous updates or deferrals, and the results of an API external inspection. The method should be considered if (1) the tank is an AST, or a bulk UST with vertical walls and a flat bottom, which would require an internal inspection following API 653, RP 12R1, STI SP0001, or equivalent;

(2) continued operations of the tank is desired;

(3) the tank owner or operator wants to take advantage of the proposed benefits of the method;

(4) minimizing air pollution that is produced whenever a tank is internally inspected is desired; and (5) The internal inspection is controlled by the corrosion of the floor or bottom of the tank.

Items through (4) can easily be addressed. Item (5) typically controls the application of the method. It can be initially assessed by performing an external inspection of the tank following API 653, or equivalent. Because this external inspection is part of a completed internal inspection, it can be done without any added expense or loss of time, if the tank fails the external inspection, a full internal inspection must be performed. Another way of assessing (5) is to make some local measurements of the tank floor thickness and the corrosion rate. This is accomplished in Step 3, and could be done sooner, as part of Step 1, if necessary.

The method was developed for tanks scheduled for an API 653 out-of-service internal inspection (of the tank floor), or equivalent, and assumes that the life expectancy of the tank is controlled by bottom floor corrosion and not the failure of other parts of the tank like the tank shell, the tank appurtenances, the tank roof, or other structural issues with the tank floor. The validity of this assumption can usually be fully assessed through the external inspection. The external inspection may not, however, confirm its validity, but it will be useful if the external inspection indicates the shell or roof corrosion is very high or the tank and its appurtenances are in sufficiently poor to warrant an API 653 internal inspection and not be considered for a deferral. This method can only be applied a maximum of two times before an internal inspection needs to be done, and a second deferral cannot be implemented if the tank is older than the expected design life of the tank. This provision implemented for determining whether or not a second deferral is possible is straightforward to use and is conservative. Some of the inspection approaches, which can be implemented as part of this method, could be used to justify two or more deferrals, but are not allowed at this point in time. For example, the use of a local set of floor thickness and corrosion rate measurements with a highly reliable means of assessing the applicability of the local measurement to the floor thickness and corrosion rates throughout the entire tank (like an AE Corrosion Activity Test result showing no corrosion activity in the tank) could be used to justify a tank inspection deferral. It is not allowed at this point if the age of the tank exceeds the design life of the tank, but after more experience with the method is gained, this method could be modified.

If the tank is not scheduled for an API 653 internal inspection, then the method sends the tank back to the beginning of the method (A). This does not mean that the method cannot be implemented, but it indicates that the tank was not scheduled for an API 653 internal inspection. For example, an update of the previous estimate of the time to an out-of-service inspection can be made, if desired.

Step 2 – Determine if the Tank has Integrity by Performing a Leak Detection Test: Once the decision to implement the method, a series of tank measurements will be made to assess the condition of the tank and the tank floor. The critical step and the basis of the method is a third-party approved leak detection test following EPA standard protocols for evaluating the performance of the method in terms of probability of detection ($P_D$) and probability of false alarm ($P_{FA}$) with the $P_D \geq 95\%$ and the $P_{FA} \leq 5\%$. If the results of the leak detection test is a PASS, then it can be assumed that the tank is alive and has not yet failed. For the purposes of this method, the tank is alive (i.e., has integrity and has not failed) if no leaks are present. It does not, for example, indicate that the floor may be buckling, etc. It does indicate that the tank has survived until the inspection age. This method takes advantage of this fact, and allows an estimate of the probability of survival to be made given that the tank has survived until the inspection age. Based on Bayesian statistics, the conditional probability will indicate that the tank now has a probability of survival on the day of the passing leak detection test of nearly 100% as compared to the survival probability distribution.

If the results of the leak detection test is a FAIL, then the tank should be taken out of service and an API 653 internal inspection should be performed. This is not a problem, because this method is typically applied to only those tanks scheduled for such an inspection, and any leaks or floor failures were already being evaluated as part of the scheduled API 653 internal inspection.

The key criterion for determining whether or not an internal inspection can be deferred is a leak detection test with a PASS.

Step 3 – Make One or More Measurements of Tank Floor Thickness and Compute Corrosion Rate in milli-inches per year (mpy): The next step is to make a measurement of the mean tank floor thickness, $T_{Meas\ at\ Age}$, from one or more locations within a tank and compute the mean corrosion rate, $CR_{Meas\ at\ Age}$. The mean corrosion rate is determined from the initial thickness of the tank floor when installed or the thickness of the tank floor since the last internal inspection using Eq. (1).

$$CR_{Meas\ at\ Age} = (T_{Original} - T_{Meas\ at\ Age})/N \qquad (1)$$

where N = time since the last inspection or installation, $T_{Original}$ is the thickness of the tank when it was installed or at the last inspection after the tank was refurbished and brought back into service. Typically, $T_{Original}$ is equal to 0.25 in., and $T_{min}$ is equal to 0.10 in. for tanks without a release prevention barrier or 0.05 in. for tanks with a release prevention barrier. The estimates of $CR_{Max\ at\ Age}$ determined from Eq. (1) is only valid if the corrosion in the tank is uniform and there are no regions of significantly higher corrosion (i.e., hot spots). While the validity of this assumption is not easily tested, it is not necessary for it to be to compute ETI, because it is only used to identify a CR distribution, which does include regions of higher corrosion and pitting, or to identify a tank age distribution in very broad regions of corrosion (i.e., Very Low, Low, Moderate, or High).

It is desirable that this measurement be made on the tank floor itself and not on a special plate that is added to the tank floor to protect the tank floor from damage. This method recommends using a measurement sensor with a precision of at least 10 mils, or 4% of the floor thickness, assuming that the corrosion rate is determined over a nominal period of 10 years, or longer. A correspondingly more accurate measurement sensor is required if the corrosion rate is computed over a shorter time period. It is important to note that this local measurement may not be representative of the corrosion rate throughout the tank or any local regions of high corrosion activity (i.e., hot spots). However, it is useful to have at least one measurement in the tank. For the purposes of this method, the computed corrosion rate represents an estimate of the uniform corrosion rate in the tank.

The maximum corrosion rate, $CR_{Max\ at\ Age}$, and the minimum thickness, $T_{Min\ at\ Age}$, can be estimated from the local tank thickness measurements, $CR_{Meas\ at\ Age}$ and $T_{Meas\ at\ Age}$, if the tank has no hot spots and is experiencing fairly uniform corrosion. $T_{Min\ at\ Age}$ can be estimated from the standard deviation, $S_{Meas\ at\ Age}$, of multiple floor thickness measurements used to estimate the mean floor thickness $T_{Meas\ at\ Age}$. $T_{Min\ at\ Age}$ can be used to estimate $CR_{Max\ at\ Age}$. A minimum of five or more tank bottom thickness measurements is needed to estimate $S_{Meas\ at\ Age}$ over a region in which 4 or more of the measurements are made at least 1 ft away from the center measurement.

$$T_{Min\ at\ Age} = T_{Meas\ at\ Age} - 3 * S_{Meas\ at\ Age} \qquad (2)$$

For the purposes of this method in generating a tank failure probability distribution, we will use $T_{Min\ at\ Age} = T_{Meas\ at\ Age}$, because it will be the best estimate of the tank failure age.

Figure 5:
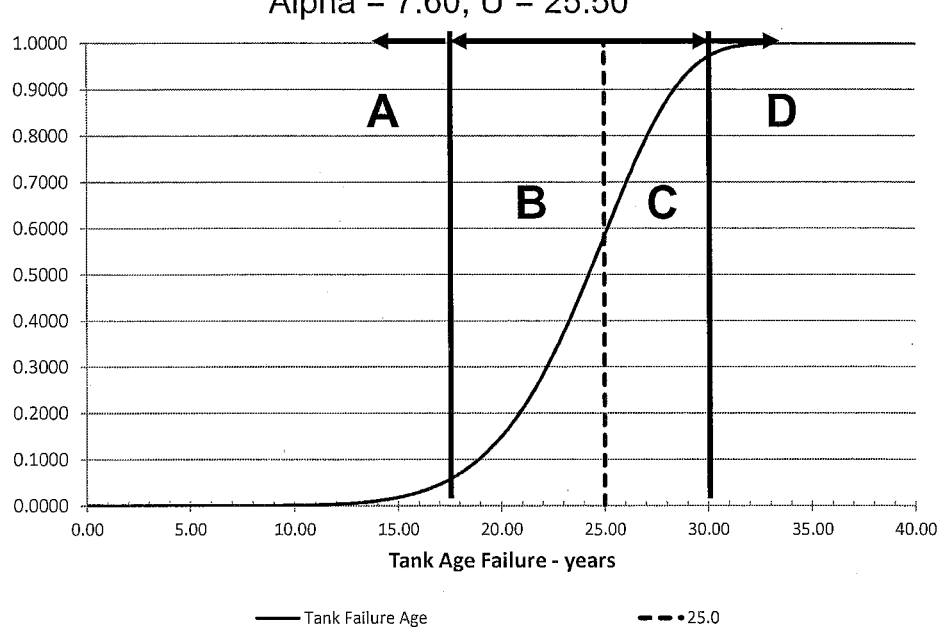
FIG. 5 illustrates a Tank Age Failure Cumulative Frequency Distribution (CFD) based on a Weibull Density Model.

Step 4 – Develop a CDF of the Tank Failure Age: The fourth step is to develop an estimate of the Tank Failure Age Distribution, F(y), also known as the Life Expectancy Distribution of the Tank, F(y), cumulative distribution function (CDF). If a PDF is developed first (e.g., FIG. 4), the CDF should be computed to facilitate computations and presentation (FIG. 5). The measured $T_{Meas\ at\ Age}$ and $CR_{Meas\ at\ Age}$ are then used to develop an estimate of the Life Expectancy Probability Distribution (i.e., Tank Failure Probability Distribution), F(y), illustrated in FIG. 5, and the Tank Survival Probability Distribution, S(y), which is 1 - F(y), where y is a random variable of the ages of the tanks, illustrated in FIG. 6. F(y) and S(y) are cumulative distribution functions (CDFs). $T_{Meas\ at\ Age}$ and $CR_{Meas\ at\ Age}$ are either used directly in developing a corrosion rate distribution, which is then used to develop F(y) and S(y) from a historical database of corrosion, or they are used indirectly as a means of identifying which F(y) and S(y) should be used that were previously developed from tank failure data for a range of corrosion conditions. This approach can be implemented without further data collection.

A probability density function (PDF) of the corrosion rates, CR(y), can be generated using the mean corrosion rate, $CR_{Meas\ at\ Age}$, measured in the tank, where y is a random variable of corrosion rates, which is defined by y = c/x, where c is a constant expressing the minimum allowable thickness of the tank, $T_{Min}$, before it is declared unsafe for use. In terms of a leak detection test, c = 0 in.; in terms of minimum safety standards for a tank with and without a release prevention barrier, it is usually 0.05 in. (50 mils) with and 0.10 in. (100 mils) without such a barrier. This PDF assumes that this tank belongs to a large population of tanks with a wide range of corrosion rates.

A corrosion rate distribution is illustrated in FIG. 2. It was developed from 400 samples of corrosion of buried steel pipe over an 18-year period and is plotted for the period of 8 to 10 years after burial (see FIG. 2). FIG. 2 illustrates the extreme value behavior of the corrosion data. The distribution has a large tail indicating that some very large corrosion rates are possible. CFDs of the maximum corrosion rate data were also generated for shorter and longer time intervals than used to generate the CFD in FIG. 2. Although the mean maximum corrosion rate decreased over time (i.e., from 2 to 17 years), it was found that the coefficient of variation determined from the mean and standard deviation of these maximum corrosion data were approximately constant. To facilitate computations, a three-parameter Weibull CDF was fit to the measured cumulative frequency distribution (CFD) of the maximum corrosion rate data (see FIG. 2) using a least squares method to develop a CDF of F(x). F(x) was then used to develop F(y) using a mathematical transformation of two random variables (i.e., corrosion rate, x, and tank age, y) described below. Thus, F(y) is generated from a transformation of F(x). Since F(x) is an extreme valued function and Weibull distributed, F(y) is also an extreme valued function and Weibull distributed. It should be note that even if F(x) was not an extreme value function and was normally distributed, the transformation from a corrosion rate distribution F(x) to a tank failure age distribution F(y) would result in a non-symmetrical distribution (i.e., extreme valued distribution) with a larger tail.

Based on a Weibull Distribution for Corrosion Rates

The following equations can be used to determine $F_Y(y)$ from the Weibull distribution CDF of the maximum corrosion rate data, Fx(x). The equations shown below were developed for a two two-parameter Weibull distribution (note: a three-parameter Weibull distribution was used to develop Fx(x) from the corrosion data in FIG. 2 by including a location factor).

$$F(x) = Fx(x) = \left[fx\left(g^{-1}(y)\right)\right]\left[d\left(g^{-1}(y)/dy\right)\right] \quad (3)$$
$$= \left[k/\lambda\right)(x/\lambda)^{k-1} EXP\left\{[x/\lambda]^k\right\}\right]\left[d\left(g^{-1}(y)/dy\right)\right]$$

where $\lambda$ is the scale factor, k is the shape factor, and $$g^{-1}(y) = 1/g(y) = 1/(c/x) = y$$

where $x = c/y$, $g^{-1}(y) = 1/g(y) = 1/(c/x) = y$, y = tank age, and x = corrosion rate, and c = maximum remaining thickness of the tank floor determined by subtracting the thickness of the tank floor from the minimum thickness at which the tank bottom should be repaired or replaced (e.g., 0.05 or 0.10 in.), and $[d(g^{-1}(y)/dy] = d (y)/dy = 1$.

$$F(y) = F_Y(y) = [k/\lambda)(x/\lambda)^{k-1} EXP\left\{[(c/y)/\lambda]^k\right\}\right]\left[d\left(g^{-1}(y)/dy\right] \quad (4)$$

where $\lambda$ is the scale factor, k is the shape factor, and $g^{-1}(y) = 1/g(y) = 1/(c/x) = y$ and $[d(g^{-1}(y)/dy] = d (y)/dy = 1$.

Based on a Normal Distribution for Corrosion Rates $$F(x) = Fx(x) = \left[1/(\sigma \, sqrt(2^*\pi))\right] * EXP\left\{-0.5 * \left[((x)-\mu)/\sigma\right]^2\right\} \quad (5)$$

where $g^{-1}(y) = 1/g(y) = 1/(c/x) = y$ and $[d(g^{-1}(y)/dy] = d (y)/dy = 1$ $$F(y) = F_Y(y) = fx\left(g^{-1}(y)\right)\left[d\left(g^{-1}(y)/dy\right)\right] = \quad (6)$$
$$\left[1/(\sigma \, sqrt(2^*\pi))\right] * EXP\left\{-0.5 * \left[((k/y)-\mu)/\sigma\right]^2\right\}\left[d\left(g^{-1}(y)/dy\right)\right]$$

where $g^{-1}(y) = 1/g(y) = 1/(c/x) = y$ and $[d(g^{-1}(y)/dy] = d (y)/dy = 1$.

Development of a Tank Failure Age CFD (i.e., Life Expectancy Distribution) based on the Measured Corrosion Rate. The life expectancy distribution can be developed from the mean corrosion rate (CR) estimated from the measured floor thickness measurement in Step 2. It is based on many measurements of corrosion of buried steel pipe of different alloys, different geographical locations, and different soil and corrosion conditions. The study showed that while the mean corrosion rate changed as a function of time, the coefficient of variation remained approximately constant. Thus, the standard deviation could be determined once the mean corrosion rate was measured. As illustrated in FIG. 2, we assumed and showed that a Weibull probability density function was a good model for the corrosion data. Since most inspections occur at 10 year intervals, we used the corrosion rate data for 8 to 10 Years. The CFDs and the PDFs and CDFs (fx(x) and Fx(x)) of the maximum corrosion data were generated using a Weibull probability distribution and the PDFs and CDFs of the tank bottom Life Expectancy ($f_Y$(y) and $F_Y$(y)) generated using the mean CR measured in Step 2 and the standard deviation S measured from a coefficient of variation equal to 0.50 can be done in a spreadsheet.

Development of a Tank Failure Age, F(x), CFD (i.e., Life Expectancy Distribution, F(x)) based on Other Measurements of Corrosion Rate. The life expectancy distribution can be developed from CR data obtained from previous API inspections. The CR data obtained in these inspections are the maximum CRs determined from bottom and top of the tank floor. A separate protocol will be developed to develop this CR distribution. At a minimum, at least 25 tanks must be used to make this estimate and it should be for the range of conditions anticipated for the storage facility.

Development of a Tank Failure Age CFD (i.e., Life Expectancy Distribution) based on Tank Failure Data. The life expectancy distribution can be developed from tank failure data or tanks which have obtained or exceeded a specific minimum thickness. A separate protocol will be developed to develop this tank failure distribution. At a minimum, at least 25 failed tanks must be used to make this estimate and it should be for the range of conditions anticipated for the storage facility.

Step 5 – Compute the Survival CDF Distribution (S(y)) of the Tank from the Life Expectancy CDF Distribution: The fifth step is to generate a Survival CDF Distribution S(y) of the tank from the Life Expectancy CDF Distribution, F(y) (i.e. the Tank Failure CDF Distribution). It is obtained by subtracting the Life Expectancy CDF Distribution from 1.0, i.e., S(y) = 1 - F(y). S(y) is the probability of survival of the tank as a function of age, y.

The Bayesian update of S(y), which is the tank survival probability distribution given that the tank has survived to the application of the method, S(y/TA), can be determined directly from S(y). S(y/TA) is obtained by normalizing the survival probabilities of S(y) from the time of application of this method, TA, to infinity, by the value of S(y) at TA, where TA is the time since the tank was new, newly refurbished, or previously was internally inspected.

Figure 6:
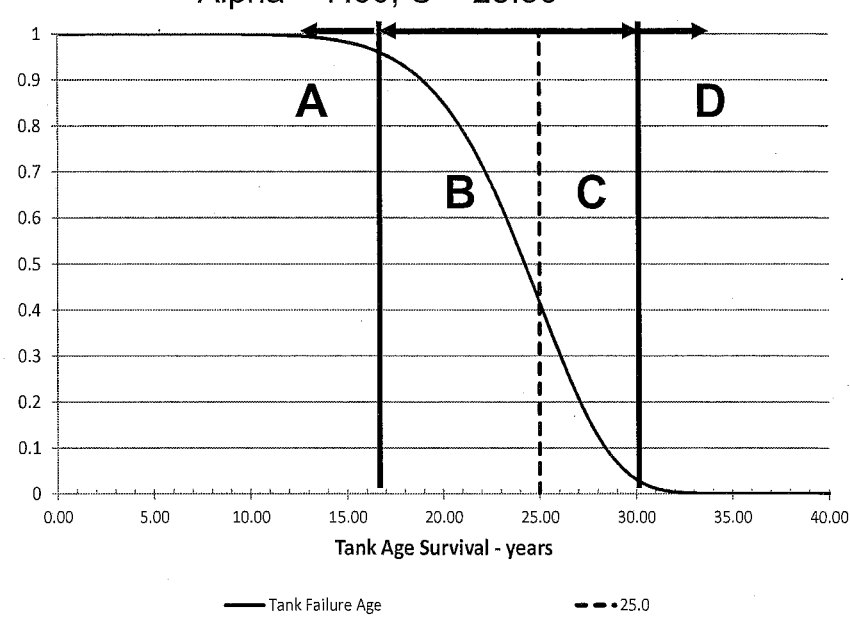
FIG. 6 illustrates a Tank Age Survival Cumulative Frequency Distribution (CFD) based on a Weibull Density Model.

Step 6 – Determine the Age Region of the Tank: This standard method will compute an Extension Time Interval (ETI) for four different Age Regions (A, B, C, D). The four Age Regions are illustrated in FIG. 6, where the Age Regions are defined as follows:

a. Tank Age < S(y) = 95% (Age Region A)
b. S(y) = 50% ≤ Tank Age > S(y) = 95% (Age Region B)
c. S(y) = 5% ≤ Tank Age > S(y) = 50% (Age Region C)
d. Tank Age < S(y) = 5% (Age Region D)

Age Regions B and C fall within the Survival CDF as defined below, and Age Regions A and D fall outside the upper and lower regions of the Survival CDF. The lower limit of Age Region B is defined by the lower tail of the CDF at a cumulative frequency defined to be 5%, or larger, and the upper limit of Age Region B is defined by the Mean or Mode of the CDF, whichever is greater. Age Region C is defined by the Mean or Mode of the CDF, whichever is greater, and the upper tail of the CDF less than or equal to 95% and is usually equal to 1 – Lower Limit. The "50%" division illustrated might also be changed to correspond to the mode or peak of the distribution.

Step 7 – Compute the Extension Time Interval (ETI) based on the Age Region of the Tank: The ETIs for each Age Region are computed below. &&&

If the age of the tank falls into Age Region D, no deferral is allowed and the tank should be taken out of service and internally inspected following API 653, or equivalent.

In general, very few tanks scheduled for an internal inspection (i.e., at least 10 years old) will fall in Age Region A. Given that the result of a leak detection test is a PASS, without any spatial information with regard to the corrosion rate, the tank should be inspected within one year of the scheduled time. If spatial information is available, then, as described Step 9, this method may provide a tank deferral time interval that is greater than the 1-year ETI, depending on the level and type of spatial information available.

If the age of the tank falls into Age Regions B or C, the Extension Time Interval (ETI) should be computed using the equivalent risk point. As illustrated in FIG. 3, it is the time interval between the probability of survival of the tank bottom, S(y), when the method is applied at TA and the same probability of survival of the tank bottom for the Bayesian update, S(y/TA), of S(y). This can be determined numerically by plotting both survival probability distributions in a spreadsheet.

It can be shown that the ETIs for tanks with ages less than the mean or mode age tend to have shorter ETIs (but higher probabilities of survival) than tanks with ages greater than the mean or mode even though the probabilities of survival are lower. This is consistent with the life expectancy estimates for tanks (and is analogous to the life expectancy of people), because the longer the tank has survived, the better chance it has of surviving, even if the probability of survival is lower. The probability of a tank, which is 22 years old, surviving until tomorrow, given that it has already survived for 22 years, is nearly 100%. The underlying Survival probability distribution would suggest a much lower probability of survival. Over time, this probability will again approach the underlying probability distribution.

Depending on the level and type of spatial information available, then, as described below, this method may provide a larger ETI if the age of the tank falls within Region B to account for the high underlying probability of survival.

The Tank Deferral Time Interval (TDTI) is equal to ETI if no spatial information is available to assess the corrosion rate for the entire tank floor.

Step 8 - Estimation of the Minimum Floor Thickness and the Maximum Corrosion Rate for the Entire Tank Floor Using "Spatial" Information: If spatial information is available, it may be possible to increase the TDTI over the ETI determined for the higher probability of survival Age Regions A and B. This method will provide an approach for computing a deferral extension time, α, based on the type and amount of spatial information that is gathered. Because a full API 653 internal inspection is not being performed and the spatial information may not be current, the maximum tank deferral interval will be limited. The flow chart describes the method of computing α for three different approaches: (1) an AE Corrosion Activity Test Result with a low corrosion activity classification (either A and B); (2) a previous API 653 internal inspection; and (3) a robotic inspection of floor thickness performed more than 1 year earlier. All three methods will be updated with the current in-tank thickness measurement and corrosion rate measurements, $TR_{Meas\ at\ Age}$ and $CR_{Meas\ at\ Age}$. The method requires that the approaches are prioritized and used in the prioritized order. One could combine two or more of the approaches, but for most cases, only one approach will be needed to obtain the maximum TDTI.

There are at least three methods that can be used to assess the spatial distribution of the corrosion activity of the entire tank floor: (1) an acoustic emission (AE) corrosion activity test indicating low corrosion activity as indicated in Loo [1999], (2) a previous API 653 internal inspection, or equivalent, with tank floor thickness measurements across the entire tank floor and in proximity to the local UT floor thickness measurements, and (3) a robotic inspection of the entire tank floor thickness with tank floor thickness measurements made in proximity to the local UT floor thickness measurements.

All three of these methods provide information about the corrosion activity and corrosion levels for the entire tank floor, but at different points in time relative to the time of the scheduled API 653 internal inspection. Other methods may be available and can be used if shown to have similar validity. At this point in time, methods that only provide information about the corrosion activity and corrosion levels for part of the tank floor will not be considered for inclusion in this method.

The approach for using Spatial Method 1, the AE Corrosion Activity Test in combination with $TR_{Meas\ at\ Age}$ and $CR_{Meas\ at\ Age}$, has the advantage over either the previous API 653 internal inspection or robotic floor thickness measurements used in combination with $TR_{Meas\ at\ Age}$ and $CR_{Meas\ at\ Age}$, because it provides a current and up-to-date estimate of the corrosion condition of the tank floor. While the other two methods may provide more detail and better measurements of floor thickness, they were typically obtained 10 to 20 years earlier and are only indicative of what to expect based on a previous period. A large number of tests indicate that if an AE Corrosion Activity Test is performed and if the result indicates little or no corrosion, then follow-up internal inspections indicate little of no corrosion and no requirements for internal tank maintenance [Loo (1999]. Thus, if the AE Corrosion Activity Test is an A or B, the measured $TR_{Meas\ at\ Age}$ and $CR_{Meas\ at\ Age}$ can be assumed to be representative of the entire tank floor and used to compute a.

When Spatial Methods 2 or 3 are used, the general procedures for computing the time interval between inspections specified in API 653 should be based on the maximum corrosion rate determined where the floor has minimum thickness, $T_{Min\ at\ Age}$, as specified in Eq. (1) and (2) below.

$$CR_{Max\ at\ Age} = \left(T_{Original} - T_{Min\ at\ Age}\right) / N \quad (7)$$

$$\alpha_1 = t_{API\ 653-1} = \text{Time to } T_{Min} = \left(T_{Min\ at\ Age} - T_{Min}\right) / CR_{Max\ at\ Age} \quad (8)$$

$$\alpha_2 = t_{API\ 653-2} = \text{Time to } T_{Mean\ Age} \quad (9)$$
$$= \left(T_{Min\ at\ Age} - T_{Mean\ Age}\right) / CR_{Max\ at\ Age}$$

where $T_{Original}$ is the thickness at the last API 653 internal inspection when the tank has been placed back into service or the mean bottom thickness when the tank was initially installed, whichever is shortest, and $t_{API\ 653}$ is the time remaining until $T_{Min}$ or $T_{Mean\ Age}$ is obtained. If the method had been performed previously and not at the time when the tank is scheduled for an internal inspection, then the method described below for a previous API 653 internal Inspection, or equivalent, should be followed to compute $T_{API\ 653}$.

Regardless of how $T_{Meas\ at\ Age}$ and $CR_{Max\ at\ Age}$ are estimated, $CR_{Max\ at\ Age}$ should be used to select the CFD in Step 4 if Spatial Methods 2 or 3 are used.

Spatial Method 1 can be used only if the measured corrosion activity is low (i.e., a test result of Grade A or perhaps Grades A and B and performed at the time of the time that the internal inspection interval is being assessed. If the measured corrosion activity is low, it can be shown that the measured thickness and computed corrosion rate can be assumed representative of the entire tank. If the AE results do not show low corrosion activity, then the TDIs should be based on the ETIs computed in Step 7. If the corrosion activity is low in the tank then $T_{Min\ at\ Age} = T_{Meas\ at\ Age}$ and $CR_{Max\ at\ Age} = CR_{Meas\ at\ Age}$, as determined by Eq. (1) in Step 3 and an estimate of the usable life, $t_{API\ 653-1}$ and $T_{API\ 653-2}$, is made using Eqs (2) and (3) above.

Spatial Method 2 can be used to estimate $CR_{Max\ at\ Age}$, $T_{Max\ at\ Age}$, and $t_{API653}$ using Eqs (1) and (2). This estimate can be used even though the measurements are 10 years old or long, because they will be updated by the local thickness and corrosion measurement and will result in overly conservative estimates. This is also true for a robotic inspection (Method 1) if such an inspection were performed more than a year prior to the scheduled internal inspection.

If a previous API 653 internal inspection had been performed, an estimate of the maximum corrosion rate ($CR_{Max\ at\ Age}$) for the tank floor using the measured thickness measurement made in the tank, $T_{Min\ at\ Age}$, using the local thickness measurements and the thickness measurements made of the entire tank floor during the previous API 653 internal inspection. If the previous API 653 report indicates the existence of localized corrosion hot spots of corrosion in the tank bottom, $T_{Min\ at\ Age}$ is estimated from the ratio of the mean $T_{API\ 653\ Meas\ at\ Age}$ in a previous API 653 at the same approximately location as the local UT in-tank measurements as part of this method and the thickness of the tank floor at the hot spot where the maximum localized corrosion has occurred. $T_{Min\ at\ Age}$ is computed using Eq. (10) below and then substituted into Eq. (1) and Eq. (2) to estimate $CR_{Max\ at\ Age}$, $t_{API\ 653-1}$ and $t_{API\ 653-2}$.

$$T_{Min\ at\ Age} = \{(T_{Min\ at\ Age}(\text{from a previous API 653 internal inspection}))*(T_{Meas\ at\ Age}/T_{API\ 653\ Meas\ at\ Age}(\text{measure during previous API 653 internal inspection}))\} \quad (10)$$

Step 9 – Maximum Remaining Life Left in the Tank Floor Based on Spatial Information, α: Two estimates of the maximum remaining life, $\alpha_1 = t_{API\ 653-1}$ and $\alpha_2 = t_{API\ 653-2}$ are calculated using Eqs (8) and (9) in Step 8. The larger of $a_1 = t_{API\ 653-1}$ and $\alpha_2 = t_{API\ 653-2}$ will be used as input to computation of the maximum allowable tank deferral time interval, $TDTI_{Max\ Allowable}$.

The value of $\alpha_1$ could have been limited to no more than 50% of $t_{API\ 653-1}$, but this will be accounted for in Step 10.

Step 10 – Estimate the Tank Deferral Time Interval (TDTI) with the Input of Spatial Information of the Corrosion Rates for the Entire Tank Floor: Table 3 summarizes how to compute the Tank Deferral Time Interval (TDTI) based on ETI and α for the different Age Regions.

TABLE 3

| | Computation of the Tank Deferral Time Interval (TDTI) | | | |
|---|---|---|---|---|
| Age Region | ETI | α | Max {ETI; α} | TDTI |
| A | 1 Year | Max {$\alpha_1$; $\alpha_2$} | Max {ETI; α} | Max {ETI; α} or 50% Inspection Interval |
| B | $ETI_B$ | Max {$\alpha_1$; $\alpha_2$} | Max {ETI; α} | Max {ETI; α} or 50% Inspection Interval |
| C | $ETI_C$ | N/A | Max {ETI; α} | Max {ETI; α} or 50% Inspection Interval |
| D | 0; API 653 Internal Inspection Required | N/A | N/A | 0; API 653 Internal Inspection Required |

If an estimate of $t_{API\ 653}$ is made in Steps 8, or 9, then α = Max {$\alpha_1 = t_{API\ 653-1}$; $\alpha_2 = t_{API\ 653-2}$}. This should be compared to the ETI computed in Step 7 for Age Regions A and B, and the maximum of α or the ETI should be used as input into the Maximum Tank Deferral Time Interval (TDTI). α allows credit for the higher probabilities of survival found in these two Age Regions. Once the maximum of Max {ETI; α} is computed, it should be compared to 50% of the original Inspection Interval computed from the last API 653 internal inspection and should be no longer than 10 years before being re-assessed. The TDTI is the smaller of the two values. This method limits the TDTI to no longer than 50% of the Inspection Interval, or no longer than 10 years, but reserves the possibility of a longer period as more data is obtained on the performance of the approaches used to implement the method. If no spatial measurements were made in Step 6, then TDI will equal the ETIs estimated in Step 6.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. An equivalent risk method for determining the time until the next out-of-service internal inspection of an aboveground storage tank (AST) or an underground storage tank (UST) based on the integrity of the tank floor and an underlying survival probability distribution for tank survivals as a function of tank age, comprising the steps of:
   (a) performing a leak detection test on the tank;
   (b) obtaining a passing result on the test to verify that the tank floor has not failed;
   (c) determining a first probability of survival from the underlying distribution for a current age of the tank;
   (d) generating a new survival probability distribution using a Bayesian approach, where a second probability of survival of said tank is assumed to be 100% at the current age according to the new survival probability distribution, with the second probability of survival being computed for future times; and
   (e) determining a time interval that is indicative of a time required for the second probability of survival to drop to the first probability of survival.

2. The method of claim 1, where said probability distribution is generated from a probability distribution of corrosion rate data.

3. The method of claim 2, where said probability distribution is generated from corrosion data of buried steel plate over a range of corrosion environments.

4. The method of claim 2, where the corrosion data is obtained from bottom thickness measurements on actual storage tanks.

5. The method of claim 2, where the probability distribution of corrosion rate data is used to compute the underlying survival probability distribution assuming a minimum acceptable tank floor thickness.

6. The method of claim 5, where said minimum floor thickness is between 0.05 in. and 0.10 in.

7. The method of claim 5, where said probability distribution of corrosion rate is modeled as a function of time by a probability function that is matched to the empirical data.

8. The method of claim 7, where said modeled distribution is a normal probability model.

9. The method of claim 7, where said modeled distribution is an extreme valued probability model.

10. The method of claim 7, where said modeled distribution is a log-normal probability model.

11. The method of claim 7, where said modeled distribution is a Weibull probability model.

12. The method of claim 1, where said underlying survival probability distribution as a function of tank age is modeled by a probability function that is matched to the empirical data.

13. The method of claim 12, where said modeled distribution is a normal probability model.

14. The method of claim 12, where said modeled distribution is an extreme valued probability model.

15. The method of claim 12, where said modeled distribution is a log-normal probability model.

16. The method of claim 12, where said modeled distribution is a Weibull probability model.

17. The method of claim 1, where said underlying tank survival probability distribution and said probability distribution of corrosion rate, both as a function time, are modeled by a probability function that is matched to the empirical data.

18. The method of claim 17, where one or both of said survival and corrosion rate models are Weibull probability models.

19. The method of claim 17, where one or both of said survival and corrosion rate models are normal probability models.

20. The method of claim 17, where one or both of said survival and corrosion rate models are extreme valued probability models.

21. The method of claim 17, where one or both of said survival and corrosion rate models are log-normal probability models.

22. The method of claim 1, where said underlying survival probability distribution is determined by accumulating a number tank failures to generate said distribution for a particular category of tank failures as defined by minimum acceptable thickness.

23. The method of claim 22, where said minimum floor thickness is between 0.05 in. and 0.10 in.

24. The method of claim 22, where said underlying survival probability distribution as a function of tank age is modeled by a probability function that is matched to the empirical data.

25. The method of claim 24, where said modeled distribution is a normal probability model.

26. The method of claim 24, where said modeled distribution is an extreme valued probability model.

27. The method of claim 24, where said modeled distribution is a log-normal probability model.

28. The method of claim 24, where said modeled distribution is a Weibull probability model.

29. An equivalent risk method for determining the time until the next out-of-service internal inspection of an aboveground storage tank (AST) or an underground storage tank (UST) based on the integrity of the tank floor and an underlying survival probability distribution for tank survival rates as a function of tank age, comprising the steps of:
   (a) performing a leak detection test on the tank;
   (b) obtaining a passing result on the test to verify that the tank has not failed;
   (c) determining a first probability of survival from the underlying distribution for a current age of the tank from a probability distribution of corrosion rates, where both probability distributions are modeled with a probability distribution using the mean corrosion rate obtained from one or a few local measurements of corrosion and the results of an acoustic emission (AE) corrosion activity test indicating little or no corrosion activity and the standard deviation obtained by multiplying said mean corrosion rate by a constant approximately equal to 0.5 to generate the corrosion rate probability model;
   (d) generating a new survival probability distribution using said probability distribution in (c) using a Bayesian approach, where a second probability of survival of said tank is assumed to be 100% at the current age according to the new survival probability distribution, with the second probability of survival being computed for future times; and
   (e) determining a time interval that is indicative of a time required for the second probability of survival to drop to the first probability of survival.

* * * * *